US010582372B2

(12) United States Patent
Muñoz Sanchez et al.

(10) Patent No.: US 10,582,372 B2
(45) Date of Patent: Mar. 3, 2020

(54) SYSTEMS AND METHODS FOR INTELLIGENT DATA QUOTA ALLOCATION AND MANAGEMENT

(71) Applicant: Verizon Patent and Licensing Inc., Arlington, VA (US)

(72) Inventors: Hugo David Muñoz Sanchez, Hillsborough, NJ (US); Landry N'drin Edi, Harrison, NJ (US); Mirza Zillur, Dumont, NJ (US); Maria Cel Halili Zaballero, Ramsey, NJ (US); Daniel Osorio, Hackensack, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/928,781

(22) Filed: Mar. 22, 2018

(65) Prior Publication Data

US 2019/0297487 A1 Sep. 26, 2019

(51) Int. Cl.
| | |
|---|---|
| *H04W 8/20* | (2009.01) |
| *H04W 72/04* | (2009.01) |
| *H04W 76/10* | (2018.01) |
| *H04L 29/08* | (2006.01) |
| *G06Q 30/06* | (2012.01) |

(52) U.S. Cl.
CPC .............. *H04W 8/20* (2013.01); *H04L 67/22* (2013.01); *H04W 72/04* (2013.01); *H04W 76/10* (2018.02); *G06Q 30/0635* (2013.01)

(58) Field of Classification Search
CPC ................................................ H04M 2215/32
See application file for complete search history.

(56) References Cited

U.S. PATENT DOCUMENTS

| | | | | |
|---|---|---|---|---|
| 9,332,419 | B2* | 5/2016 | Nadgir | H04W 8/186 |
| 10,051,533 | B2* | 8/2018 | Fitzpatrick | H04W 48/18 |
| 2013/0023230 | A9* | 1/2013 | Momtahan | H04L 12/14 |
| | | | | 455/405 |
| 2014/0105018 | A1* | 4/2014 | Andrews | H04L 41/5006 |
| | | | | 370/235 |
| 2015/0222759 | A1* | 8/2015 | Baker | G06Q 20/105 |
| | | | | 455/405 |
| 2015/0271342 | A1* | 9/2015 | Gupta | H04M 15/60 |
| | | | | 455/406 |
| 2015/0288827 | A1* | 10/2015 | Bejerano | H04M 17/10 |
| | | | | 455/406 |
| 2015/0341503 | A1* | 11/2015 | Chandramouli | H04L 12/1407 |
| | | | | 455/405 |

(Continued)

*Primary Examiner* — Kathy W Wang-Hurst
*Assistant Examiner* — Frank E Donado

(57) ABSTRACT

A device may receive, from a network device, a credit control request to allocate a quota to a subscriber device. The quota may relate to access, by the subscriber device, to network resources provided by a network provider. The device may determine a subscriber value based on historical usage of network resources by the subscriber device, identify a group value based on historical usage of network resources by a group of subscriber devices with which the subscriber device is associated, and determine a particular quota to allocate to the subscriber device based on a baseline quota, the subscriber value, and a group value. The device may perform one or more actions to cause the particular quota to be allocated to the subscriber device based on determining the particular quota.

20 Claims, 15 Drawing Sheets

(56) References Cited

U.S. PATENT DOCUMENTS

| | | | |
|---|---|---|---|
| 2016/0100063 A1* | 4/2016 | Tasker | H04L 12/1485 455/407 |
| 2016/0105785 A1* | 4/2016 | Wiant | H04M 17/02 455/406 |
| 2016/0135186 A1* | 5/2016 | Sun | H04W 72/0453 370/329 |
| 2016/0164752 A1* | 6/2016 | Larsson | H04M 15/61 455/408 |
| 2017/0237621 A1* | 8/2017 | Reynolds | H04L 41/0896 455/406 |
| 2017/0295258 A1* | 10/2017 | Raleigh | H04L 67/20 |
| 2018/0167517 A1* | 6/2018 | Rolfe | H04M 15/765 |

* cited by examiner

SYSTEMS AND METHODS FOR INTELLIGENT DATA QUOTA ALLOCATION AND MANAGEMENT

BACKGROUND

A network provider, such as a wireless telecommunications provider, typically grants or allocates, to a subscriber, a quota of service units (e.g., for data, minutes, messages, balance, and/or the like) based on a plan subscribed to by the subscriber. For example, if a subscriber subscribes to a 10 gigabyte (GB) prepaid data plan, the network provider might grant the subscriber a quota for a percentage of 10 GB of data to use, when the subscriber requests (e.g., via a subscriber device) to connect to the network.

DETAILED DESCRIPTION OF PREFERRED EMBODIMENTS

Figure 1A:
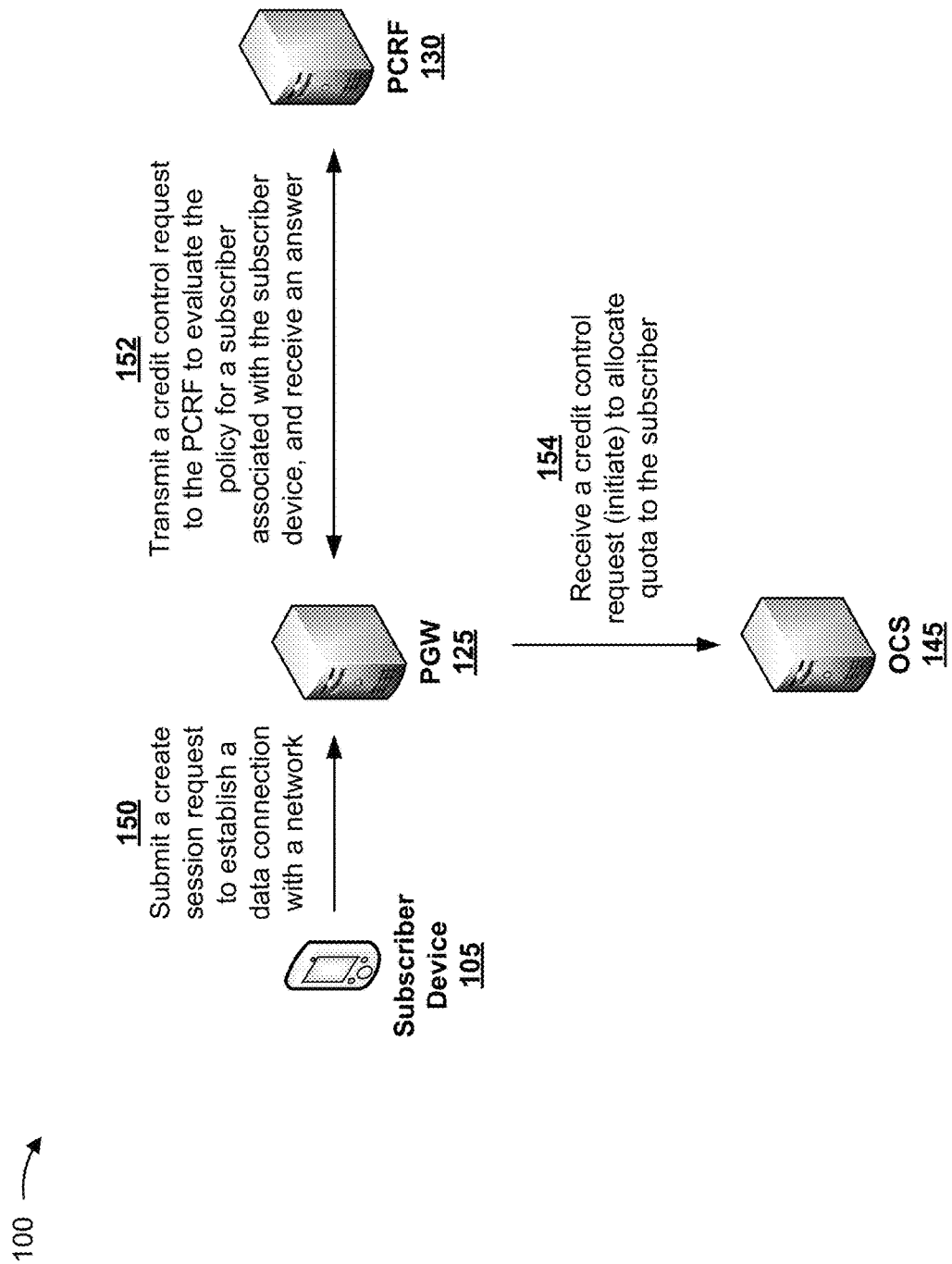
FIGS. 1A-1D are diagrams of an overview of an example implementation described herein.

The following detailed description of example implementations refers to the accompanying drawings. The same reference numbers in different drawings may identify the same or similar elements.

In many cases, a network provider grants a quota for a fixed percentage (e.g., 10%) of a subscriber's total purchased or available network resources, up to a maximum value. For example, if a subscriber subscribes to a 3 GB prepaid data plan, the network provider might grant service units in 250 megabyte (MB) chunks (e.g., at initiation of a data session). When the granted service units are used or consumed (or when a validity timer associated with the granted service units expires), and additional network resources are still needed, requests for, and grants of, additional service units may be made. However, granting or allocating service units in such a manner is inefficient. For example, in a case where a network provider grants a relatively small amount of quota to a subscriber for a data session that involves high network resource usage (e.g., streaming of high definition video), multiple requests for, and grants of, additional service units are often made. As another example, in a case where a network provider grants a relatively large amount of quota to a subscriber for a data session that involves low network resource usage (e.g., sending a short multimedia messaging service (MMS) message), starvation—e.g., where network resources allocated for one service, such as MMS messaging, are not available for other services, such as data-related services (e.g., watching a short video clip)—might occur.

Some implementations, described herein, enable a network device (e.g., of a network provider) to dynamically (or intelligently) allocate quota to a subscriber (e.g., a subscriber device) based on the subscriber's (e.g., the subscriber device's) historical usage of network resources and/or based on historical usage of network resources by a group of subscribers (e.g., a group of subscriber devices) with which the subscriber (e.g., the subscriber device) is associated. In some implementations, the network device is capable of dynamically (or intelligently) allocating quota based on a subscriber's (e.g., a subscriber device's) current pattern of consumption or utilization of network resources in real-time. In this way, the network device may reduce or eliminate the possibility of over-allocating and/or under-allocating network resources to a subscriber (e.g., a subscriber device), which optimizes the overall allocation of network resources across the network provider's subscriber base, and optimizes network traffic in network environments, such as fifth generation (5G) networks. In addition, this reduces a quantity of call path messages (e.g., messages between a packet data network gateway (PGW) and an online charging system (OCS) and/or the like) that need to be transmitted between devices of the network for purposes of allocating quota, and reduces a quantity of billing-related records (e.g., diameter Rf records) that need to be created and/or maintained (e.g., by the PGW, by a charging collection function (CCF), and/or the like). This reduces workload on the devices of the network, which conserves network, processing, and memory resources, and reduces the chance of failure relating to transmission and receipt of such messages, thereby improving overall system reliability. Furthermore, intelligent allocation of quota reduces or eliminates the possibility of starvation of network resources. Starvation of network resources may occur when a final portion of network resources that are available to a subscriber or an associated subscriber device (e.g., the last 50 MB of data available in a 2 GB data plan and/or the like) is allocated entirely for a particular use (e.g., MMS messaging), which prevents the subscriber (e.g., the subscriber device) from being able to utilize any of such portion of network resources for another purpose (e.g., to stream a video). Intelligent allocation of quota frees up network resources for use by various applications, since a final portion of available network resources may be dynamically allocated, in smaller increments, for use by different applications.

In real-time rating, a subscriber (e.g., a subscriber device) typically receives messages regarding network resources that the subscriber (e.g., the subscriber device) has utilized or consumed. Without dynamic (or intelligent) allocation of quota (that is, absent the implementations described herein), a fixed amount of quota is typically allocated each time a request for more network resources is received. In such a case, a real-time rating subscriber might receive numerous messages at times of high network resource usage (which inundates the subscriber), and might receive very few messages at times of low network resource usage (which leaves the subscriber unaware of the subscriber's (e.g., the subscriber device's) consumption of network resources for a long period of time). Implementing dynamic (or intelligent) allocation of quota, as described herein, in real-time rating settings, permits a subscriber (e.g., a subscriber device) to receive messages regarding the subscriber's (e.g., the subscriber device's) consumption of network resources in a more spread out (or even) fashion throughout the course of a day.

FIGS. 1A-1D are diagrams of an overview of an example implementation 100 described herein.

Figure 1B:
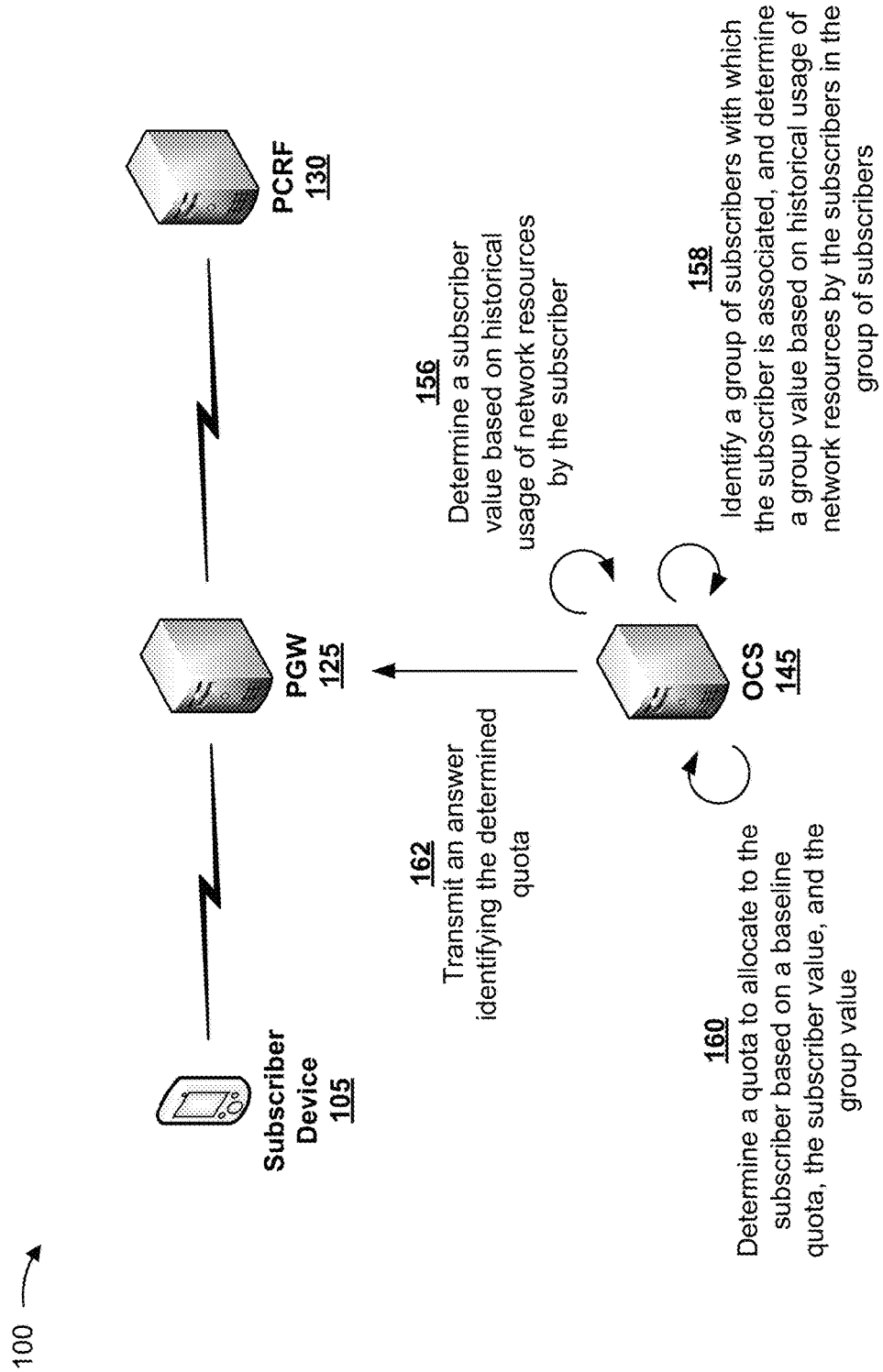

As shown in FIGS. 1A and 1B, example implementation 100 may include a subscriber device 105, a packet data network gateway (PGW) 125, a policy and charging rules function (PCRF) 130, and an online charging system (OCS) 145. In some implementations, subscriber device 105 may be associated with a subscriber of wireless telecommunications services provided by a network provider. In some implementations, PGW 125 and OCS 145 may communicate with one another via a Gy interface (e.g., by way of Gy diameter messages). In some implementations, the network provider may utilize PGW 125, PCRF 130, OCS 145, and/or the like to provide services to subscribers.

As shown in FIG. 1A, and as shown by reference number 150, subscriber device 105 may submit a create session request to establish a data connection with a network (e.g., to stream a high definition video from a web site, to send an MMS, and/or the like). Although not shown, subscriber device 105 may submit the request via a network (e.g., a long term evolution (LTE) network, a next generation network, such as a 5G network, via one or more base stations, and/or the like) and to a mobility management entity (MME), which may provide the request to a server gateway (SGW), and ultimately to PGW 125.

As shown by reference number 152, PGW 125 may transmit, to PCRF 130, a credit control request to evaluate the policy for the subscriber associated with subscriber device 105, and may receive, from PCRF 130, an answer. In some implementations, PCRF 130 may store subscriber information, such as voice call and data plans or quotas for subscribers, and may evaluate information regarding the subscriber (e.g., based on rules and/or policies associated with the subscriber) to determine whether the subscriber (e.g., subscriber device 105) is permitted to utilize network resources (e.g., data-related resources, voice-related resources (e.g., minutes), messaging-related resources (e.g., text messages), balance-related resources (e.g., inquiries regarding balance of data, minutes, and/or texts), and/or the like) of the network provider. Here, PCRF 130 may provide an answer to PGW 125 that indicates that the subscriber (e.g., subscriber device 105) is permitted to utilize network resources of the network provider (e.g., that subscriber device 105 is permitted to utilize high speed data, low speed data, and/or the like). As shown by reference number 154, OCS 145 may receive, from PGW 125, a credit control request (initiate) to allocate quota (e.g., a quota of service units) to the subscriber (e.g., subscriber device 105).

As shown in FIG. 1B, and as shown by reference number 156, OCS 145 may determine a subscriber value based on historical usage of network resources by the subscriber (e.g., subscriber device 105). In some implementations, OCS 145 may store and/or have access to information regarding historical usage of network resources by the subscriber (e.g., subscriber device 105). For example, the information can be stored in one or more data structures (e.g., one or more databases, one or more lists, one or more tables, and/or the like). The information may include, for example, information regarding an amount of data usage or consumption, by the subscriber (e.g., subscriber device 105), during certain hours of a day, on certain days of a week, on certain days of a month, on certain days of a year (e.g., on holidays), and/or the like. For example, in a case where the subscriber (e.g., subscriber device 105) tends to consume a large amount of data on weekdays from 8:00 AM to 9:30 AM and from 5:00 PM to 6:30 PM (e.g., during the subscriber's commuting times), OCS 145 may identify such a pattern of usage, and may store and associate, with the subscriber (e.g., subscriber device 105), information regarding the pattern of usage.

In some implementations, OCS 145 (and/or one or more other devices) may provide information regarding usage of network resources by subscriber(s) (e.g., subscriber device(s)) as input to one or more machine learning algorithms, which may perform machine learning to automate future determinations of subscriber values. For example, OCS 145 may train a machine learning algorithm based on known inputs (e.g., network resource usage data and/or the like) and known outputs (e.g., subscriber values). The machine learning algorithm may output subscriber values based on input information, such as network resource usage data and/or the like. In some implementations, OCS 145 may refine a machine learning algorithm based on feedback received from one or more devices (e.g., management device(s)). For example, one or more management devices may provide information indicating whether subscriber values, generated by the machine learning algorithm, are accurate and/or suitable. When the information indicates that a particular subscriber value is accurate and/or suitable, OCS 145 may configure the machine learning algorithm to generate subscriber values based on the particular subscriber value (e.g., to generate subscriber values in a manner that the particular subscriber value was generated). When the information indicates that a particular subscriber value is not accurate or suitable, OCS 145 may configure the machine learning algorithm to avoid generating subscriber values in a manner that the particular subscriber value was generated. In this way, OCS 145 can generate subscriber values based on a machine learning algorithm, which improves the accuracy of the subscriber values, and conserves processor and/or storage resources that may otherwise be used to store rules for generating subscriber values.

In some implementations, the subscriber values may be a whole number or a fraction. In some implementations, the subscriber values may be determined in relation to a baseline (e.g., standard) quota, such as a quota that is granted at initiation of a data session and that may be associated with a validity time or timer (e.g., a time after which any unused quota is returned to OCS 145 (e.g., 8 hours)), and may be different at different times. For example, in a case where the network service provider would typically grant a quota for 250 MB of data at initiation of a data session, and where a particular subscriber (e.g., a particular subscriber device 105) tends to use twice that amount of data (e.g., 500 MB) on Monday mornings, OCS 145 may, based on a request (e.g., to initiate a data session) received from the subscriber (e.g., the particular subscriber device 105) on a Monday morning, determine the subscriber value to be '2.' As another example, in a case where the network service provider would typically grant a quota for 250 MB of data per data session request, and where a particular subscriber (e.g., a particular subscriber device 105) tends to use half of that amount of data (e.g., 125 MB) on Sunday nights, OCS 145 may, based on a request (e.g., to initiate a data session) received from the subscriber (e.g., the particular subscriber device 105) on a Sunday evening, determine the subscriber value to be '0.5.'

As shown by reference number 158, OCS 145 may identify a group of subscribers (e.g., a group of subscriber devices) with which the subscriber (e.g., subscriber device 105) is associated, and determine a group value based on historical usage of network resources by the subscribers in the group of subscribers (e.g., the subscriber devices in the group of subscriber devices). In some implementations, OCS 145 may identify a group of subscribers (e.g., a group of subscriber devices) based on profiles of various subscribers (e.g., various subscriber devices).

In some implementations, OCS 145 may identify a group of subscribers based on a plan to which the subscriber is subscribed. For example, in a case where the subscriber is subscribed to plan or account that provides the subscriber with 3 GB of data usage per month, the group of subscribers may include all subscribers that are subscribed to the 3 GB data plan.

In some implementations, OCS 145 may identify a group of subscribers (e.g., a group of subscriber devices) based on the subscribers' (e.g., the subscriber devices') usage of network resources (e.g., manners of usage of network resources) during certain hours of a day, the subscribers' (e.g., the subscriber devices') usage of network resources during certain day(s) of a week, the subscribers' (e.g., the subscriber devices') usage of network resources during certain day(s) of a month, the subscribers' (e.g., the subscriber devices') usage of network resources during certain day(s) of a year (e.g., during holidays), the subscribers' (e.g., the subscriber devices') usage of network resources during events (e.g., parades, events held at entertainment venues, and/or the like), the subscribers' (e.g., the subscriber devices') usage of network resources via certain types of devices (e.g., Internet of Things (IoT) devices), the subscribers' (e.g., the subscriber devices') usage of network resources at certain locations, and/or the like. For example, in a case where numerous subscribers (e.g., subscriber devices) utilize network resources in manners that are similar to, or correspond to, one another, the group of subscribers (e.g., the group of subscriber devices) may include all such subscribers (e.g., all such subscriber devices). As an example, in a case where numerous subscribers (e.g., numerous subscriber devices) tend to consume a large amount of data on Saturday evenings (e.g., for movie streaming), the group of subscribers may include all such subscribers (e.g., all such subscriber devices). In some implementations, OCS 145 may identify a group of subscribers (e.g., a group of subscriber devices) based on historical purchases (e.g., for network-related services and/or the like) made by subscribers (e.g., made via subscriber devices). In some implementations, OCS 145 may identify all subscribers (e.g., all subscriber devices) in the network provider's subscriber base as being part of a group of subscribers (e.g., a group of subscriber devices).

In some implementations, OCS 145 (and/or one or more other devices) may provide information regarding usage of network resources by subscribers (e.g., subscriber devices), in one or more groups of subscribers (e.g., groups of subscriber devices), as input to one or more machine learning algorithms, which may perform machine learning to automate future determinations of group values. For example, OCS 145 may train a machine learning algorithm based on known inputs (e.g., network resource usage data and/or the like) and known outputs (e.g., group values). The machine learning algorithm may output group values based on input information, such as network resource usage data and/or the like. In some implementations, OCS 145 may refine a machine learning algorithm based on feedback received from one or more devices (e.g., management device(s)). For example, one or more management devices may provide information indicating whether group values, generated by the machine learning algorithm, are accurate and/or suitable. When the information indicates that a particular group value is accurate and/or suitable, OCS 145 may configure the machine learning algorithm to generate group values based on the particular group value (e.g., to generate group values in a manner that the particular group value was generated). When the information indicates that a particular group value is not accurate or suitable, OCS 145 may configure the machine learning algorithm to avoid generating group values in a manner that the particular group value was generated. In this way, OCS 145 can generate group values based on a machine learning algorithm, which improves the accuracy of the group values, and conserves processor and/or storage resources that may otherwise be used to store rules for generating group values.

In various implementations, and similar to the subscriber value, the group value may be a whole number or a fraction, may be determined in relation to a baseline quota, and/or may be different at different times. In some implementations, OCS 145 may determine the subscriber value, identify the group of subscribers (e.g., the group of subscriber devices), and/or determine the group value, prior to subscriber device 105 submitting the create session request. For example, and in some implementations, OCS 145 may track or monitor (e.g., continuously, periodically, and/or based on user input) usage of network resources by the subscriber (e.g., the subscriber device) and/or by the group of subscribers (e.g., by the group of subscriber devices) over time, and determine and/or update (e.g., continuously, periodically, and/or based on user input) the subscriber value and/or the group value for each subscriber (e.g., for each subscriber device).

As shown by reference number 160, OCS 145 may determine a quota to allocate to the subscriber (e.g., subscriber device 105) based on a baseline quota, the subscriber value, and the group value. In some implementations, OCS 145 may determine the quota by multiplying a baseline quota by both the subscriber value and the group value. For example, in a case where baseline quota is 250 MB, where the subscriber value is 1.3, at a given time, and where the group value is 2.2 at that time, OCS 145 may determine the quota by multiplying 250 MB by 1.3 and 2.2 (e.g., 715 MB). The quota represents an amount of data that subscriber device 105 is permitted to use, within a given period of time, which permits proper monitoring of quota allocation to subscriber device 105, and ensures that a user of subscriber device 105 is properly alerted regarding usage of data.

In some implementations, OCS 145 may determine the quota based on only one of the subscriber value or the group value. In some implementations, OCS 145 may determine the quota based on one or more additional values (e.g., configurable based on user input, based on machine learning, and/or the like). For example, an additional value may be determined or defined for emergency purposes, such as when there is a network overload condition that results in numerous subscribers requesting (e.g., via the subscribers' subscriber devices) data-related resources. In such a case, OCS 145 may employ a large value (e.g., a large value to multiply with a value of a baseline quota, a subscriber value, and/or a group value) so as to allocate more data-related resources to some or all of the subscribers (e.g., some or all of the subscriber devices), which may reduce a quantity of call path messages flowing through the network (thereby conserving network and processing resources).

As shown by reference number 162, OCS 145 may transmit an answer identifying the determined quota. In some implementations, PGW 125 may cause a corresponding amount of network resources to be allocated to the subscriber (e.g., subscriber device 105) (e.g., for a predefined period of time (e.g., a validity time), such as about 8 hours, 4 hours, 2 hours, and/or the like).

Figure 1C:
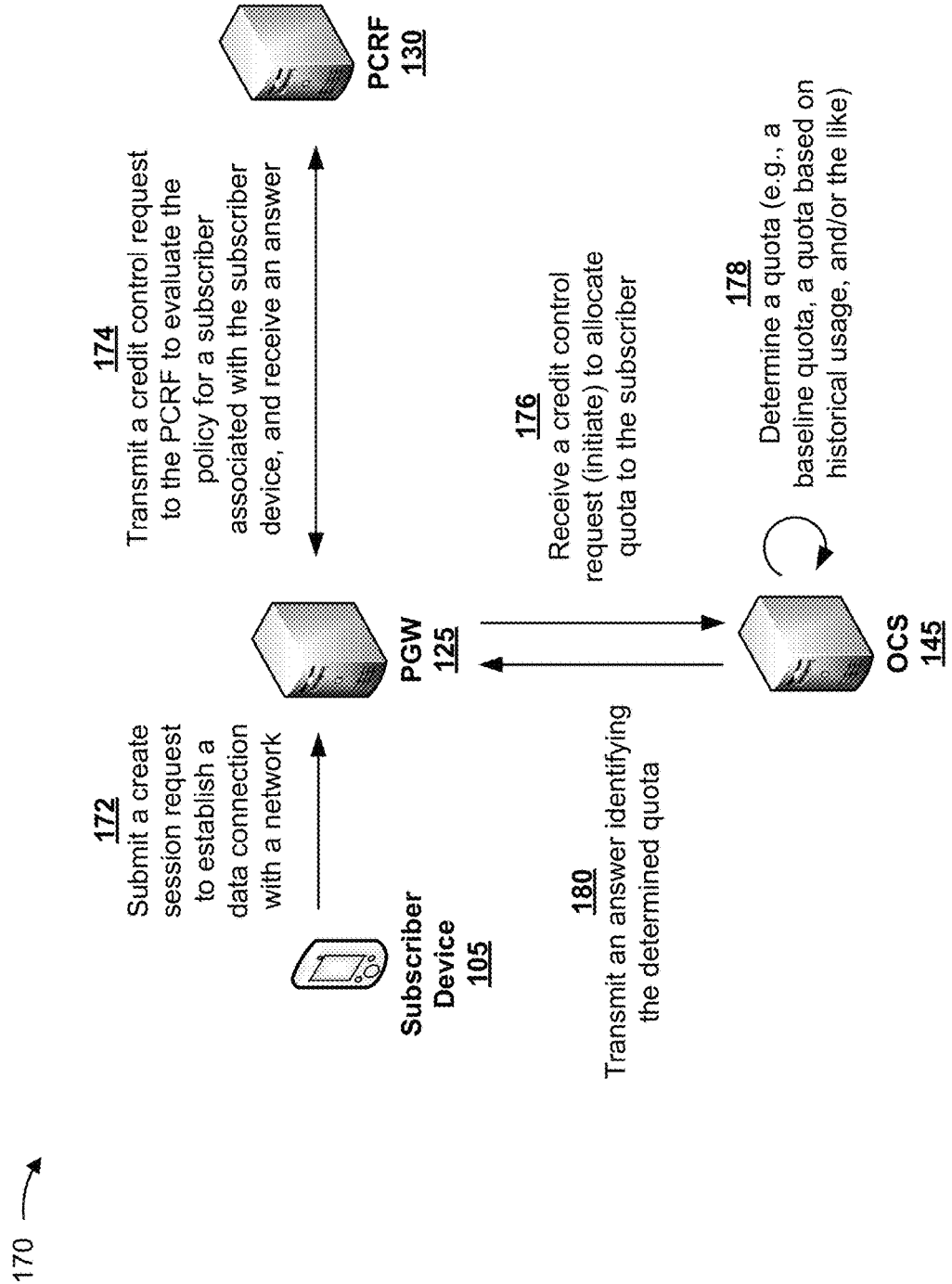
Figure 1D:
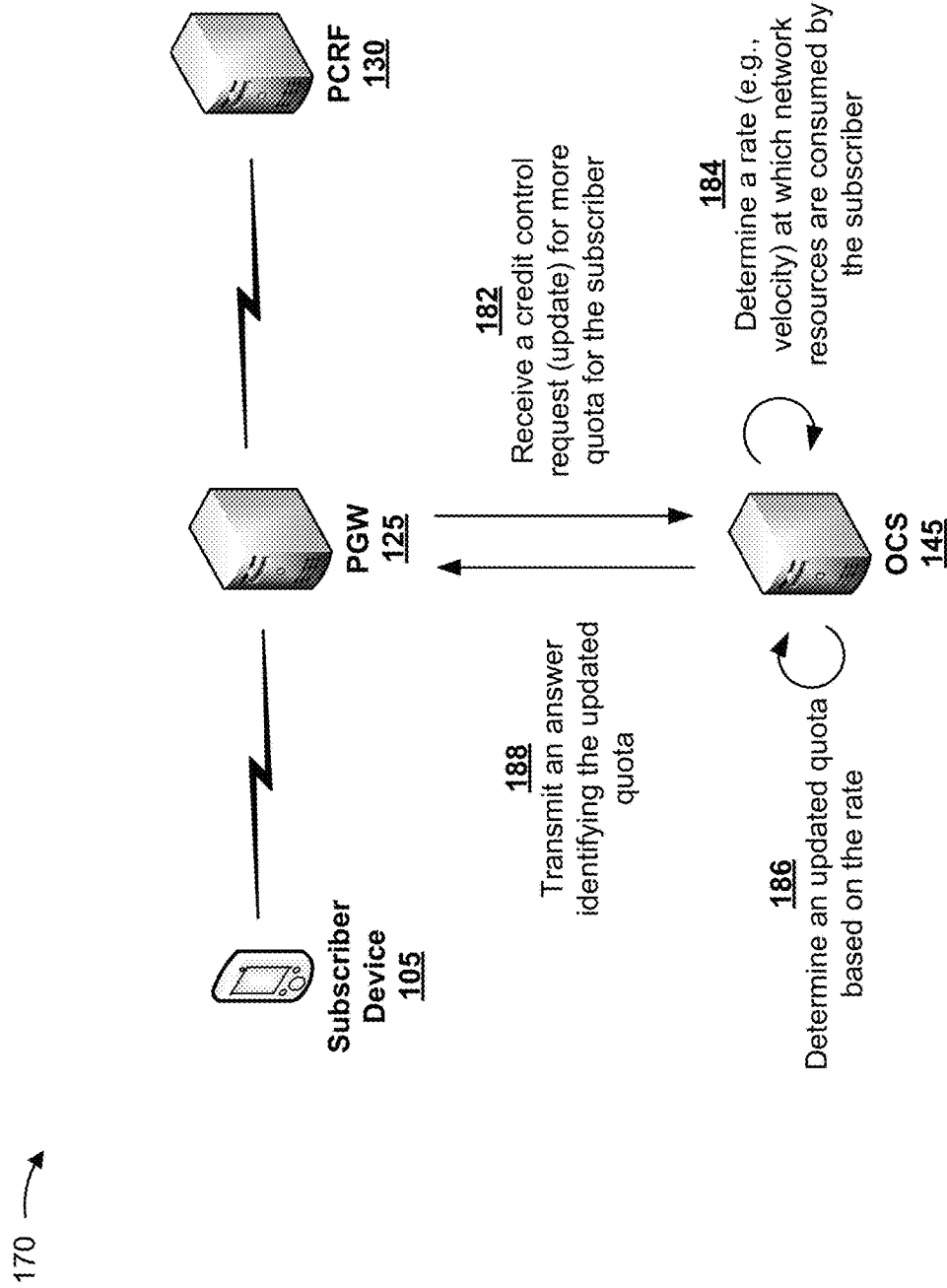

As shown in FIGS. 1C and 1D, and similar to example implementation 100 shown in FIGS. 1A and 1B, example implementation 170 may include a subscriber device 105, a PGW 125, a PCRF 130, and an OCS 145. In some implementations, example implementation 170 may be used in conjunction with example implementation 100.

As shown in FIG. 1C, and as shown by reference number 172, subscriber device 105 may submit a create session request to establish a data connection with a network (e.g., similar to reference number 150 of example implementation 100). As shown by reference number 174, PGW 125 may transmit, to PCRF 130, a credit control request to evaluate the policy for the subscriber associated with subscriber device 105, and receive, from PCRF 130, an answer (e.g., similar to reference number 152 of example implementation 100). As shown by reference number 176, OCS 145 may receive a credit control request (initiate) to allocate quota to the subscriber (e.g., subscriber device 105) (e.g., similar to reference number 154 of example implementation 100).

As shown by reference number 178, OCS 145 may determine a quota. For example, OCS 145 may identify a baseline quota (e.g., for 250 MB for 8 hours if the subscriber just began a new prepaid plan) and/or a quota based on historical usage of network resources (e.g., by the subscriber (e.g., subscriber device 105), by a group of subscribers (e.g., a group of subscriber devices) with which the subscriber (e.g., subscriber device 105) is associated, and/or the like, as described above with respect to example implementation 100). As shown by reference number 180, OCS 145 may transmit an answer identifying the determined quota. In some implementations, PGW 125 may cause a corresponding amount of network resources to be allocated to the subscriber (e.g., subscriber device 105) (e.g., for a predefined period of time (e.g., a validity time), such as 8 hours, 4 hours, 2 hours, and/or the like).

As shown in FIG. 1D, and as shown by reference number 182, OCS 145 may receive, from PGW 125, a credit control request (update) to allocate more quota to the subscriber (e.g., subscriber device 105). In some implementations, PGW 125 may submit such a request based on the subscriber (e.g., subscriber device 105) consuming the allocated network resources (e.g., the 250 MB of data) or based on expiration of a validity timer (e.g., 8 hours). As one example, subscriber device 105 may have streamed a 480p video and utilized 250 MB of data within 30 minutes of the quota allocation. As another example, subscriber device 105 may have only utilized 50 MB, of the 250 MB of data, to receive e-mails, and a validity timer now expires.

As shown by reference number 184, OCS 145 may determine a rate (e.g., a velocity) at which network resources are utilized or consumed by the subscriber (e.g., subscriber device 105). In some implementations, the rate or velocity may be determined based on an amount of network resources consumed over a duration of a session. For example, in a case where subscriber device 105 utilized 250 MB of data within 30 minutes, OCS 145 may determine the rate at which network resources are utilized by subscriber device 105 to be 250 MB/30 minutes (or about 8.33 MB per minute and/or the like). As another example, in a case where subscriber device 105 only utilized 50 MB of data in an 8-hour period, OCS 145 may determine the rate at which network resources are utilized by subscriber device 105 to be 50 MB/8 hours (or about 0.104 MB per minute and/or the like).

As shown by reference number 186, OCS 145 may determine an updated quota based on the rate (or velocity) at which network resources are utilized by the subscriber (e.g., subscriber device 105) (e.g., based on the rate satisfying (e.g., exceeding or not exceeding) one or more thresholds). As an example, in a case where subscriber device 105's current rate of usage of network resources is high (e.g., 8.33 MB per minute), OCS 145 may determine that a higher quota should be granted to subscriber device 105 (e.g., a quota having a value that is higher than a value of a prior allocated quota). Continuing the example, OCS 145 may determine to grant a quota for use of 2 GB of data, 3 GB of data, 4 GB of data, and/or the like, to subscriber device 105 (e.g., for a validity time of 8 hours, 4 hours, 2 hours, 1 hour, and/or the like). This can reduce or eliminate a need for OCS 145 to receive an excess quantity of quota-related requests such as would likely occur in a case where network resources are under-allocated to subscriber device 105. As another example, in a case where subscriber device 105's current rate of usage of network resources is low (e.g., 0.104 MB per minute), OCS 145 may determine that a lower quota should be granted to subscriber device 105 (e.g., a quota having a value that is lower than a value of a prior allocated quota). Continuing the example, OCS 145 may determine to grant a quota for use of only 50 MB of data to subscriber device 105 (e.g., for a validity time of 8 hours, 4 hours, 2 hours, 1 hour, and/or the like).

As shown by reference number 188, OCS 145 may transmit an answer identifying the updated quota, in which case, PGW 125 may cause a corresponding amount of network resources to be allocated to the subscriber (e.g., subscriber device 105).

In a case where a subscriber (e.g., a subscriber device) consumes network resources at a high rate (e.g., streaming high definition video and consuming an initial quota of 250 MB of data within 30 minutes), where OCS 145 then grants a high quota (e.g., for use of 2 GB of data, 3 GB of data, 4 GB of data, and/or the like), and where the subscriber (e.g., the subscriber device) continues to consume network resources at a high rate (e.g., 8.33 MB per minute and/or the like), OCS 145 may grant a high quota (e.g., for use of 2 GB of data, 3 GB of data, 4 GB of data, and/or the like) each time more quota is requested for the subscriber (e.g., the subscriber device). In a case where a subscriber (e.g., a subscriber device) consumes network resources at a low rate (e.g., checking e-mails and consuming only 50 MB of data within an 8-hour period), where OCS 145 then grants a low quota (e.g., for use of 50 MB of data), and where the subscriber (e.g., the subscriber device) then utilizes network resources at a high rate (e.g., to stream music or videos), OCS 145 may grant a higher quota the next time more quota is requested for the subscriber (e.g., the subscriber device) (e.g., if 50 MB of data is consumed within 30 minutes, OCS 145 may grant a quota for use of 800 MB of data for the next validity time period (e.g., for the next 8 hours)). In either case, if the subscriber (e.g., the subscriber device) halts consumption of the allocated data-related resources, any remaining quota may be returned to OCS 145 (e.g., after expiration of the validity time), and OCS 145 may later determine and grant quota to the subscriber (e.g., the subscriber device) based on subsequent real-time rates of usage of network resources by the subscriber (e.g., the subscriber device) (including, for example, historical rates of usage of network resources by the subscriber or subscriber device, by a group of subscribers or a group of subscriber devices with which the subscriber or subscriber device is associated, and/or the like).

In some implementations, OCS 145 may determine a quota to allocate to a subscriber (e.g., a subscriber device) in a top down manner, such as based on the historical usage of network resources by the group of subscribers (e.g., the group of subscriber devices), then based on historical usage of network resources by the subscriber (e.g., the subscriber device), and then based on real-time usage of network resources by the subscriber (e.g., the subscriber device). In some implementations, OCS 145 may determine historical usage of network resources by a subscriber (e.g., a subscriber device) based on real-time usage of network resources by the subscriber (e.g., the subscriber device), and may determine overall historical usage of network resources by a group of subscribers (e.g., the group of subscriber devices) (e.g., in a bottom up manner) based on the historical usage of network resources by each subscriber in the group of subscribers (e.g., by each subscriber device in the group of subscriber devices).

Although some implementations are described herein with respect to data-related resources, the implementations apply similarly or equally to other types of network resources, such as voice-related resources, messaging-related resources, balance-related resources, and/or the like. In such cases, for example, OCS 145 may determine, for a subscriber (e.g., a subscriber device), different subscriber values and/or different group values for the different types of network resources.

Furthermore, although implementations are described herein with respect to prepaid plans or accounts, the implementations apply equally or similarly to postpaid plans or accounts (e.g., in the context of usage control services), real-time rating functions, group sharing arrangements (e.g., account group sharing), and/or the like. For example, usage control, in a postpaid plan, permits a subscriber to restrict or limit usage of certain network resources (e.g., data-related resources) for certain users associated with the subscriber (e.g., children), which is generally similar or equivalent to prepaid plans or accounts. Thus, the implementations described herein with respect to prepaid accounts may be applied in usage control settings.

As another example, the implementations described herein may be applied to group sharing arrangements—e.g., by assigning portions (e.g., blocks) of network resources to different lines (e.g., different sub-accounts or sub-users associated with a subscriber account) based on historical and/or real-time usage of network resources associated with such sub-accounts or sub-users.

In this way, a network device may reduce or eliminate the possibility of over-allocating and/or under-allocating network resources to a subscriber (e.g., a subscriber device), which optimizes the overall allocation of network resources across a network provider's subscriber base, and optimizes network traffic in network environments, such as 5G networks. In addition, this significantly reduces a quantity of call path messages (e.g., messages between a PGW and an OCS over a diameter Gy interface and/or the like) that need to be transmitted between devices of the network for purposes of allocating quota, and reduces a quantity of billing-related records (e.g., diameter Rf records) that need to be created and/or maintained (e.g., by the PGW, by a CCF, and/or the like). This reduces bandwidth and workload on the devices of the network which, in turn, conserves network, processing, and memory resources and improves reliability by reducing the chance of failure relating to transmission and receipt of such messages. Furthermore, intelligent allocation of quota reduces or eliminates the possibility of starvation of network resources by freeing up network resources for use by various applications, since a final portion of available network resources may be dynamically allocated, in smaller increments, for use by different applications.

As indicated above, FIGS. 1A-1D are provided merely as examples. Other examples are possible and may differ from what was described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of example implementation 100 may perform one or more functions described as being performed by another set of devices of example implementation 100. Similarly, and additionally, or alternatively, a set of devices (e.g., one or more devices) of example implementation 170 may perform one or more functions described as being performed by another set of devices of example implementation 170.

Figure 2:
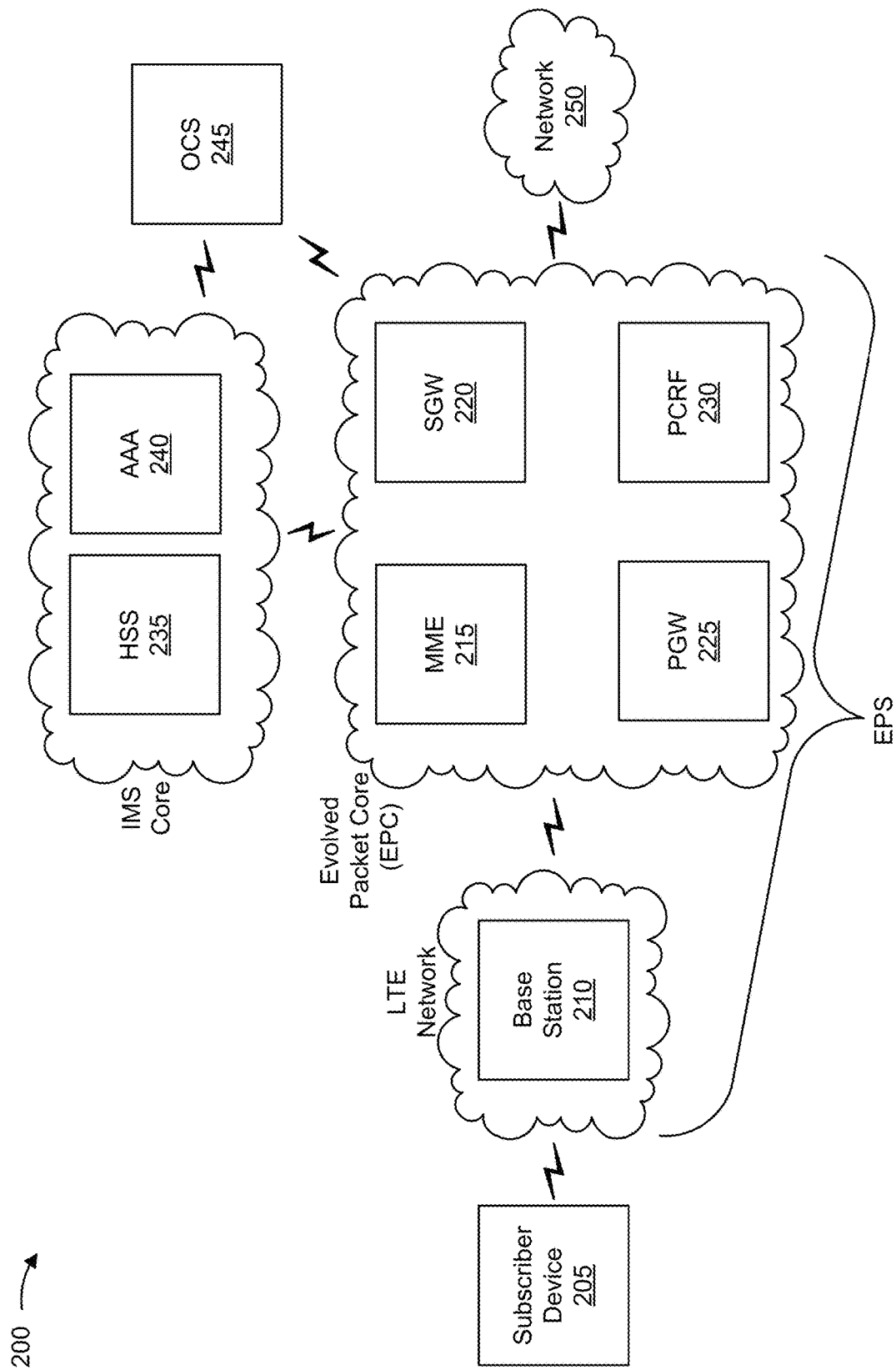
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a subscriber device 205, a base station 210, an MME 215, an SGW 220, a PGW 225, a PCRF 230, a home subscriber server (HSS) 235, an authentication, authorization, and accounting server (AAA) 240, an OCS 245, and a network 250. Devices of environment 200 may interconnect via wired connections, wireless connections, or a combination of wired and wireless connections.

Some implementations are described herein as being performed within an LTE network for explanatory purposes. Some implementations may be performed within a network that is not an LTE network, such as a third generation (3G) network, a 5G network, and/or the like.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which subscriber device 205 communicates with the EPC. The EPC may include MIME 215, SGW 220, and/or PGW 225 that enable subscriber device 205 to communicate with network 250 and/or an Internet protocol (IP) multimedia subsystem (IMS) core. The IMS core may include HSS 235 and AAA 240, and may manage device registration and authentication, session initiation, etc., associated with subscriber device 205. HSS 235 and AAA 240 may reside in the EPC and/or the IMS core.

Subscriber device 205 includes one or more devices capable of communicating with base station 210 and/or a network (e.g., network 250). For example, subscriber device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, an IoT device, a sensor device, and/or a similar device. Subscriber device 205 may send traffic to and/or receive traffic from network 250 (e.g., via base station 210, SGW 220, and/or PGW 225).

Base station 210 includes one or more devices capable of transferring traffic, such as audio, video, text, and/or other traffic, destined for and/or received from subscriber device 205. In some implementations, base station 210 may include an eNB associated with the LTE network that receives traffic from and/or sends traffic to network 250 via SGW 220 and/or PGW 225. Additionally, or alternatively, one or more base stations 210 may be associated with a RAN that is not associated with the LTE network. Base station 210 may send traffic to and/or receive traffic from subscriber device 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with subscriber device 205. In some implementations, MME 215 may perform operations relating to authentication of subscriber device 205. Additionally, or alternatively, MME 215 may facilitate the selection of a particular SGW 220 and/or a particular PGW 225 to serve traffic to and/or from subscriber device 205. MME 215 may perform operations associated with handing off subscriber device 205 from a first base station 210 to a second base station 210 when subscriber device 205 is transitioning from a first cell associated with the first base station 210 to a second cell associated with the second base station 210. Additionally, or alternatively, MME 215 may select another MME (not pictured), to which subscriber device 205 should be handed off (e.g., when subscriber device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 250 (e.g., via PGW 225) and/or other network devices associated with the EPC and/or the IMS core. SGW 220 may also receive traffic from network 250 and/or other network devices, and may send the received traffic to subscriber device 205 via base station 210. Additionally, or alternatively, SGW 220 may perform operations associated with handing off subscriber device 205 to and/or from an LTE network.

PGW 225 includes one or more devices capable of providing connectivity for subscriber device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 250. Additionally, or alternatively, PGW 225 may receive traffic from network 250, and may send the traffic to subscriber device 205 via SGW 220 and base station 210. PGW 225 may record data usage information (e.g., byte usage), and may provide the data usage information to AAA 240.

PCRF 230 includes one or more network devices or other types of communication devices. PCRF 230 may store subscriber information, such as voice call and data rate plans or quotas for subscribers. PCRF 230 may provide network control regarding service data flow detection, gating, Quality of Service (QoS), and/or flow-based charging. Policies and rules regarding QoS may include policies and rules instructing subscriber device 205 and/or network elements (base station 210, SGW 220, PGW 225, etc.) to minimize packet loss, to implement a packet delay budget, to provide a guaranteed bit rate (GBR), to provide a particular latency, to reduce RF signal congestion, and/or to perform other activities associated with QoS. PCRF 230 may provide policies and rules to other network devices, such as base station 210, SGW 220, PGW 225, and/or the like, to implement network control. PCRF 230 may determine how a certain service data flow shall be treated, and may ensure that subscriber plane traffic mapping and QoS is in accordance with a subscriber's profile and/or network policies. In some implementations, PCRF 230 may receive a service indicator from PGW 225 over a Gx interface, and use the service indicator to identify and transmit charging information and/or a charging data function (CDF) identifier to PGW 225 over the Gx interface.

HSS 235 includes one or more devices, such as one or more server devices, capable of managing (e.g., receiving, generating, storing, processing, and/or providing) information associated with subscriber device 205. For example, HSS 235 may manage subscription information associated with subscriber device 205, such as information that identifies a subscriber profile of a user associated with subscriber device 205, information that identifies services and/or applications that are accessible to subscriber device 205, location information associated with subscriber device 205, a network identifier (e.g., a network address) that identifies subscriber device 205, information that identifies a treatment of subscriber device 205 (e.g., quality of service information, a quantity of minutes allowed per time period, a quantity of data consumption allowed per time period, etc.), and/or similar information. HSS 235 may provide this information to one or more other devices of environment 200 to support the operations performed by those devices.

AAA 240 includes one or more devices, such as one or more server devices, that perform authentication, authorization, and/or accounting operations for communication sessions associated with subscriber device 205. For example, AAA 240 may perform authentication operations for subscriber device 205 and/or a user of subscriber device 205 (e.g., using one or more credentials).

OCS 245 includes one or more devices, such as one or more server devices, that perform real-time (e.g., continuous) billing operations based on service usage. OCS 245 may receive information identifying an RF access signaling usage billing policy and/or an RF access signaling usage control policy. OCS 245 may determine whether RF access signaling usage of subscriber device 205 satisfies one or more RF access signaling usage thresholds associated with the RF access signaling usage billing policy and/or the RF access signaling usage control policy. OCS 245 may cause PCRF 230 to provide the one or more RF access signaling usage thresholds to PGW 225. When subscriber device 205 satisfies one or more of the thresholds, OCS 245 may provide billing information, information identifying other RF access signaling usage thresholds, or other information, to one or more devices (e.g., subscriber device 205, PCRF 230, HSS 235, AAA 240, etc.). In some implementations, OCS 245 may control access, by subscriber device 205, to a service and/or an application (e.g., based on one or more restrictions, such as time-of-day restrictions, location restrictions, single or multiple access restrictions, read/write restrictions, etc.), may track resources consumed by subscriber device 205 (e.g., a quantity of voice minutes consumed, a quantity of data consumed, etc.), and/or may perform similar operations. Although not shown, OCS 245 may include or be associated with one or more routers (e.g., a diameter-router (D-router)) configured to interface with PGW 225 and/or PCRF 230 (e.g., with PGW 225 over a Gy interface to exchange Gy diameter messages). In some implementations, OCS 245 may be implemented as one or more applications.

Network 250 includes one or more wired and/or wireless networks. For example, network 250 may include a cellular network (e.g., an LTE network, a 3G network, a 5G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
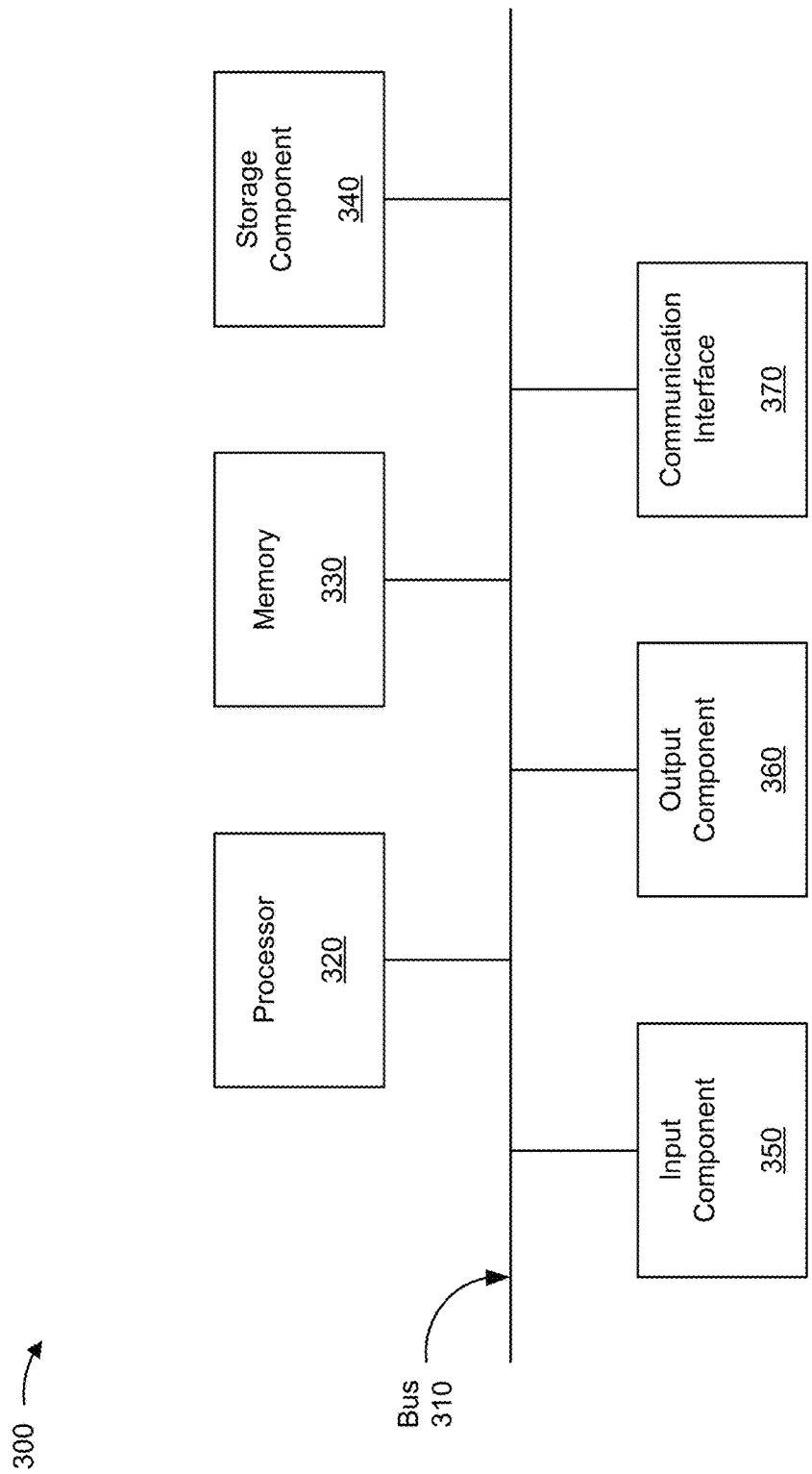
FIG. 3 is a diagram of example components of one or more devices of FIG. 2.

FIG. 3 is a diagram of example components of a device 300. Device 300 may correspond to subscriber device 205, base station 210, MME 215, SGW 220, PGW 225, PCRF 230, HSS 235, AAA 240, and/or OCS 245. In some implementations, subscriber device 205, base station 210, MME 215, SGW 220, PGW 225, PCRF 230, HSS 235, AAA 240, and/or OCS 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
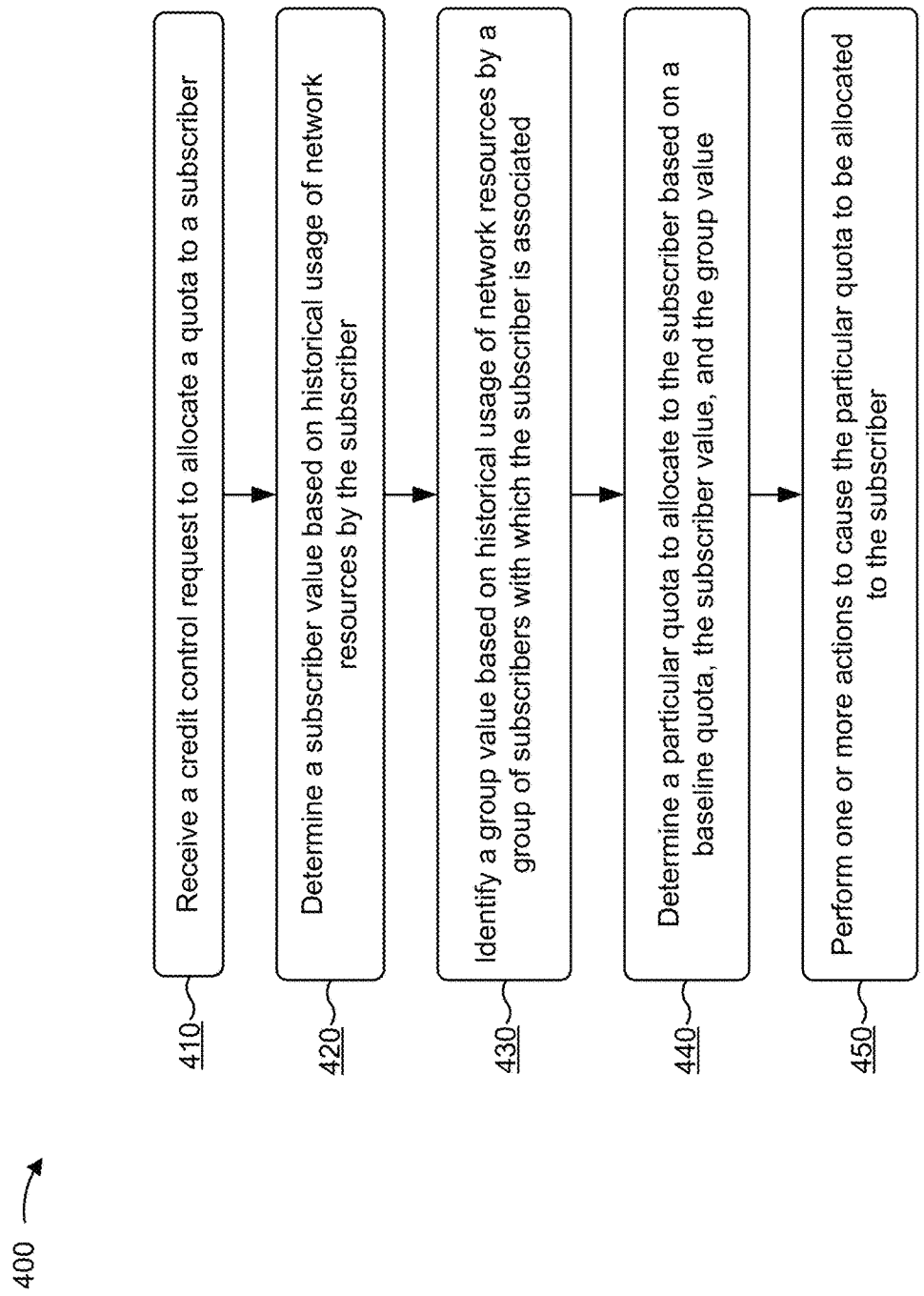
FIG. 4 is a flow chart of an example process for dynamic allocation of quota based on historical usage of network resources.

FIG. 4 is a flow chart of an example process 400 for dynamic allocation of quota based on historical usage of network resources. In some implementations, one or more process blocks of FIG. 4 may be performed by OCS 245. In some implementations, one or more process blocks of FIG. 4 may be performed by another device or a group of devices separate from or including OCS 245, such as subscriber device 205, base station 210, MME 215, SGW 220, PGW 225, PCRF 230, HSS 235, and/or AAA 240.

As shown in FIG. 4, process 400 may include receiving a credit control request to allocate a quota to a subscriber (e.g., a subscriber device) (block 410). For example, OCS 245

(e.g., using processor 320, memory 330, storage component 340, communication interface 370, and/or the like) may receive, from PGW 225, a credit control request to allocate a quota to a subscriber device 205. In practice, OCS 245 may receive thousands, millions, billions, etc. of credit control requests to allocate quota for thousands, millions, billions, etc. of subscriber devices. In this way, OCS 245 may receive credit control requests to allocate quota in a manner that cannot be performed manually or objectively by a human actor. In some implementations, OCS 245 may receive the credit control request in a manner that is the same as or similar to that described above with respect to FIGS. 1A and 1B.

In some implementations, the quota may relate to access, by subscriber device 205, to network resources provided by a network provider. In various implementations, the quota may relate to access to data-related resources, voice-related resources, messaging-related resources, and/or balance-related resources. In some implementations, the credit control request may relate to quota for a prepaid plan or a postpaid plan subscribed to by a subscriber associated with subscriber device 205. In some implementations, OCS 245 may receive the credit control request based on an input by a user of subscriber device 205.

In this way, OCS 245 may receive a credit control request to allocate a quota to a subscriber (e.g., a subscriber device), which may enable OCS 245 to determine a subscriber value based on historical usage of network resources by the subscriber (e.g., the subscriber device).

As further shown in FIG. 4, process 400 may include determining a subscriber value based on historical usage of network resources by the subscriber (e.g., the subscriber device) (block 420). For example, OCS 245 (e.g., using processor 320, memory 330, storage component 340, and/or the like) may determine a subscriber value based on historical usage of network resources by subscriber device 205. In practice, OCS 245 may determine thousands, millions, billions, etc. of subscriber values based on historical usage of network resources relating to thousands, millions, billions, etc. of subscriber devices. In this way, OCS 245 may determine subscriber values based on historical usage of network resources in a manner that cannot be performed manually or objectively by a human actor. In some implementations, OCS 245 may determine the subscriber value in a manner that is the same as or similar to that described above with respect to FIGS. 1A and 1B.

In some implementations, the historical usage of network resources by the subscriber (e.g., by subscriber device 205) may include a historical pattern of utilization of network resources by the subscriber (e.g., by subscriber device 205) during certain hours of a day, on a certain day of a week, and/or on a certain day of a year. In this case, OCS 245 may determine the subscriber value based on the historical pattern of utilization of network resources. In some implementations, OCS 245 may monitor usage of network resources by the subscriber (e.g., by subscriber device 205) over time. In this case, OCS 245 may determine the subscriber value based on the monitored usage.

In this way, OCS 245 may determine a subscriber value based on historical usage of network resources by the subscriber (e.g., by subscriber device 205), which may enable OCS 245 to identify a group value based on historical usage of network resources by a group of subscribers (e.g., a group of subscriber devices) with which the subscriber (e.g., the subscriber device) is associated.

As further shown in FIG. 4, process 400 may include identifying a group value based on historical usage of network resources by a group of subscribers (e.g., a group of subscriber devices) with which the subscriber (e.g., the subscriber device) is associated (block 430). For example, OCS 245 (e.g., using processor 320, memory 330, storage component 340, and/or the like) may identify a group value based on historical usage of network resources by a group of subscriber devices with which subscriber device 205 is associated. In practice, OCS 245 may identify thousands, millions, billions, etc. of group values based on historical usage of network resources. In this way, OCS 245 may identify group values in a manner that cannot be performed manually or objectively by a human actor. In some implementations, OCS 245 may identify the group value in a manner that is the same as or similar to that described above with respect to FIGS. 1A and 1B.

In some implementations, the group of subscribers may include subscribers that are subscribed to a plan to which the subscriber is subscribed. Additionally, or alternatively, the group of subscribers may include subscribers (e.g., a group of subscriber devices) that consume network resources in a manner that is similar to a manner in which the subscriber (e.g., subscriber device 205) consumes network resources. In some implementations, OCS 245 may monitor usage of network resources by one or more subscribers in the group of subscribers (e.g., one or more subscriber devices in the group of subscriber devices) over time. In this case, OCS 245 may identify the group value by determining the group value based on the monitored usage.

In this way, OCS 245 may identify a group value based on historical usage of network resources by a group of subscribers (e.g., a group of subscriber devices) with which the subscriber (e.g., the subscriber device) is associated, which may enable OCS 245 to determine a particular quota to allocate to the subscriber (e.g., the subscriber device) based on a baseline quota, the subscriber value, and the group value.

As further shown in FIG. 4, process 400 may include determining a particular quota to allocate to the subscriber (e.g., the subscriber device) based on a baseline quota, the subscriber value, and the group value (block 440). For example, OCS 245 (e.g., using processor 320, memory 330, storage component 340, and/or the like) may determine a particular quota to allocate to the subscriber (e.g., subscriber device 205) based on a baseline quota, the subscriber value, and the group value. In practice, OCS 245 may determine thousands, millions, billions, etc. of particular quotas to allocate to thousands, millions, billions, etc. of subscriber devices. In this way, OCS 245 may determine particular quotas to allocate to subscriber devices in a manner that cannot be performed manually or objectively by a human actor. In some implementations, OCS 245 may determine the particular quota in a manner that is the same as or similar to that described above with respect to FIGS. 1A and 1B.

In some implementations, OCS 245 may determine the particular quota by multiplying the baseline quota with the subscriber value and/or the group value. In some implementations, OCS 245 may determine a current pattern of consumption of network resources by the subscriber (e.g., subscriber device 205). In this case, OCS 245 may determine the particular quota further based on the current pattern of consumption of network resources.

In this way, OCS 245 may determine a particular quota to allocate to the subscriber (e.g., the subscriber device) based on a baseline quota, the subscriber value, and the group value, which may enable OCS 245 to perform one or more actions to cause the particular quota to be allocated to the subscriber (e.g., the subscriber device).

As further shown in FIG. 4, process 400 may include performing one or more actions to cause the particular quota to be allocated to the subscriber (e.g., the subscriber device) (block 450). For example, OCS 245 (e.g., using processor 320, memory 330, storage component 340, communication interface 370, and/or the like) may perform one or more actions to cause the particular quota to be allocated to the subscriber (e.g., subscriber device 205). In practice, OCS 245 may perform actions to cause particular quota to be allocated to each of thousands, millions, billions, etc. of subscribers (e.g., subscriber devices). In this way, OCS 245 may perform actions relating to allocation of particular quota in a manner that cannot be performed manually or objectively by a human actor. In some implementations, OCS 245 may perform the one or more actions in a manner that is the same as or similar to that described above with respect to FIGS. 1A and 1B.

In this way, OCS 245 may perform one or more actions to cause the particular quota to be allocated to the subscriber (e.g., the subscriber device).

Table 1 shows example quantifications of reductions of Gy diameter messages—e.g., in cases where a subscriber (e.g., a subscriber device) consumes all data available in a prepaid data plan in a single period (e.g., a single "sitting")—based on historical usage of network resources by the subscriber (e.g., the subscriber device) and by a group of subscribers (e.g., a group of subscriber devices) with which the subscriber (e.g., the subscriber device) is associated. As shown in Table 1, implementation of intelligent quota allocation based on historical usage of network resources (e.g., as described above with respect to example implementation 100 and/or process 400), relative to not implementing such intelligent quota allocation, can result in a reduction in a quantity of Gy diameter messages relating to the subscriber or subscriber device (e.g., by 50% in a case where the subscriber is subscribed to a prepaid data plan A, by 47% in a case where the subscriber is subscribed to a prepaid data plan B, by 86% in a case where the subscriber is subscribed to a prepaid data plan C, and by 87% in a case where the subscriber is subscribed to the "Other Plan"). Here, OCS 245 is assumed to allocate a quota for use of a maximum of 2,048 MB of data. In a case where OCS 245 allocates a higher quota (e.g., for use of more than 2,048 MB of data), the reduction of Gy diameter messages may be even greater.

TABLE 1

| Example Baseline Values | | | | |
|---|---|---|---|---|
| Quota (% of bucket) | | | | 10 |
| Max Quota for unlimited plans (MB) | | | | 2048 |
| Max Quota for prepaid (capped) plans (MB) | | | | 250 |
| Min Quota (MB) | | | | 50 |
| Diameter messages per Quota | | | | 2 |
| # of CCR-u messages to close out bucket | | | | 2 |
| Plan denomination | Plan A | Plan B | Plan C | Other Plan |
| Example Prepaid Plans | | | | |
| Plan size (GB) | 3 | 7 | 10 | 30 |
| Bucket size (MB) | 3072 | 7168 | 10240 | 30720 |
| Without "Intelligent" Quota Allocation | | | | |
| Quota size (MB) | 250 | 250 | 250 | 250 |
| min # of Quotas | 13 | 29 | 41 | 123 |
| Total Gy diameter messages | 28 | 60 | 84 | 248 |

TABLE 1-continued

| Example "Intelligent" Quota Allocation | | | | |
|---|---|---|---|---|
| Group Multiplier Value | 3 | 2 | 6 | 6 |
| Subscriber Multiplier Value | 0.8 | 1 | 2 | 2 |
| Final Quota Allocated (MB) | 600 | 500 | 2048 | 2048 |
| Min # of Quotas | 6 | 15 | 5 | 15 |
| Total Gy diameter messages | 14 | 32 | 12 | 32 |
| Example Gy Diameter Message Reductions | | | | |
| # of messages reduced/eliminated | 14 | 28 | 72 | 216 |
| % reduction in Gy traffic | 50% | 47% | 86% | 87% |

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
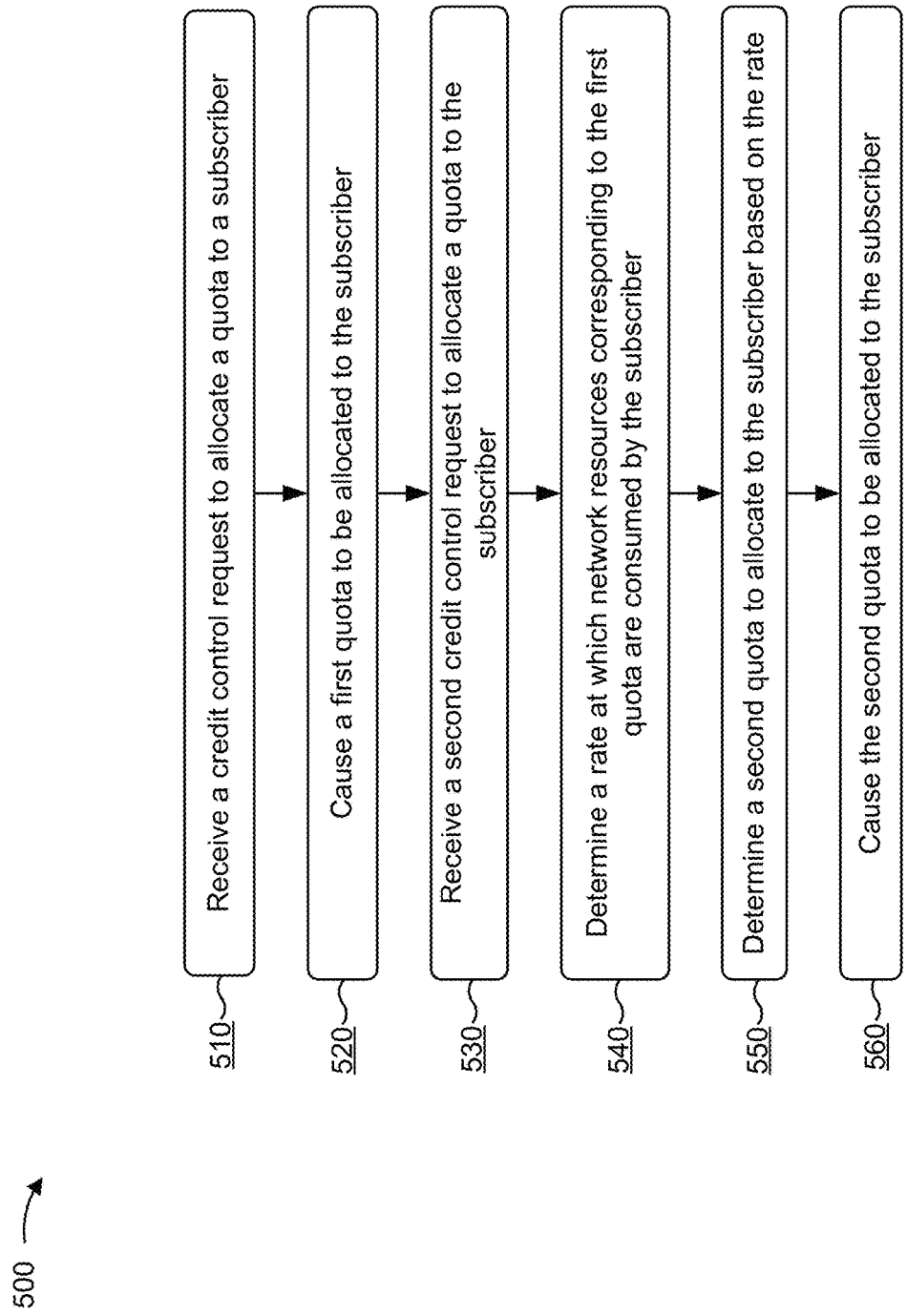
FIG. 5 is a flow chart of an example process for dynamic allocation of quota based on real-time usage of network resources.

FIG. 5 is a flow chart of an example process 500 for dynamic allocation of quota based on real-time usage of network resources. In some implementations, one or more process blocks of FIG. 5 may be performed by OCS 245. In some implementations, one or more process blocks of FIG. 5 may be performed by another device or a group of devices separate from or including OCS 245, such as subscriber device 205, base station 210, MME 215, SGW 220, PGW 225, PCRF 230, HSS 235, and/or AAA 240.

As shown in FIG. 5, process 500 may include receiving a credit control request to allocate a quota to a subscriber (e.g., a subscriber device) (block 510). For example, OCS 245 (e.g., using processor 320, memory 330, storage component 340, communication interface 370, and/or the like) may receive, from PGW 225, a credit control request to allocate a quota to a subscriber (e.g., a subscriber device 205). In practice, OCS 245 may receive a credit control request to allocate quota for thousands, millions, billions, etc. of subscribers (e.g., subscriber devices). In this way, OCS 245 may receive credit control requests to allocate quotas in a manner that cannot be performed manually or objectively by a human actor. In some implementations, OCS 245 may receive the credit control request in a manner that is the same as or similar to that described above with respect to FIGS. 1C and 1D.

In some implementations, the credit control request may relate to data-related resources provided by the network provider. In some implementations, the quota may relate to access, by a subscriber device associated with the subscriber, to network resources provided by a network provider.

In this way, OCS 245 may receive a credit control request to allocate a quota to a subscriber (e.g., a subscriber device), which may enable OCS 245 to cause a first quota to be allocated to the subscriber (e.g., the subscriber device).

As further shown in FIG. 5, process 500 may include causing a first quota to be allocated to the subscriber (e.g., the subscriber device) (block 520). For example, OCS 245 (e.g., using processor 320, memory 330, storage component 340, communication interface 370, and/or the like) may cause a first quota to be allocated to the subscriber (e.g., subscriber device 205). In practice, OCS 245 may cause quota to be allocated to each of thousands, millions, billions, etc. of subscribers (e.g., subscriber devices). In this way, OCS 245 may cause quota to be allocated to subscribers (e.g., subscriber devices) in a manner that cannot be performed manually or objectively by a human actor. In some implementations, OCS 245 may cause the quota to be allocated in a manner that is the same as or similar to that described above with respect to FIGS. 1C and 1D.

In this way, OCS 245 may cause a first quota to be allocated to the subscriber (e.g., the subscriber device), which may enable OCS 245 to receive a second credit control request to allocate a quota to the subscriber (e.g., the subscriber device).

As further shown in FIG. 5, process 500 may include receiving a second credit control request to allocate a quota to the subscriber (e.g., the subscriber device) (block 530). For example, OCS 245 (e.g., using processor 320, memory 330, storage component 340, communication interface 370, and/or the like) may receive, from PGW 225, a second credit control request to allocate a quota to the subscriber (e.g., subscriber device 205). In practice, OCS 245 may receive thousands, millions, billions, etc. of credit control requests to allocate quota for thousands, millions, billions, etc. of subscribers (e.g., subscriber devices). In this way, OCS 245 may receive credit control requests to allocate quota for subscribers (e.g., subscriber devices) in a manner that cannot be performed manually or objectively by a human actor. In some implementations, OCS 245 may receive the credit control request in a manner that is the same as or similar to that described above with respect to FIGS. 1C and 1D.

In some implementations, OCS 245 may receive the second credit control request after the first quota has been allocated to the subscriber (e.g., the subscriber device), and after the subscriber (e.g., the subscriber device) has consumed the network resources corresponding to the first quota.

In this way, OCS 245 may receive a second credit control request to allocate a quota to the subscriber (e.g., the subscriber device), which may enable OCS 245 to determine a rate at which network resources corresponding to the first quota are consumed by the subscriber (e.g., the subscriber device).

As further shown in FIG. 5, process 500 may include determining a rate at which network resources corresponding to the first quota are consumed by the subscriber (e.g., the subscriber device) (block 540). For example, OCS 245 (e.g., using processor 320, memory 330, storage component 340, communication interface 370, and/or the like) may determine a rate at which network resources corresponding to the first quota are consumed by the subscriber (e.g., subscriber device 205). In practice, OCS 245 may determine thousands, millions, billions, etc. of rates of consumption of network resources by subscribers (e.g., subscriber devices). In this way, OCS 245 may determine rates of consumption of network resources in a manner that cannot be performed manually or objectively by a human actor. In some implementations, OCS 245 may determine the rate in a manner that is the same as or similar to that described above with respect to FIGS. 1C and 1D.

In some implementations, OCS 245 may determine the rate based on a time of receipt of the second credit control request (e.g., relative to a time at which the first quota was allocated).

In this way, OCS 245 may determine a rate at which network resources corresponding to the first quota are consumed by the subscriber (e.g., the subscriber device), which may enable OCS 245 to determine a second quota to allocate to the subscriber (e.g., the subscriber device) based on the rate.

As further shown in FIG. 5, process 500 may include determining a second quota to allocate to the subscriber (e.g., the subscriber device) based on the rate (block 550). For example, OCS 245 (e.g., using processor 320, memory 330, storage component 340, communication interface 370, and/or the like) may determine a second quota to allocate to the subscriber (e.g., subscriber device 205) based on the rate. In practice, OCS 245 may determine quota to allocate to thousands, millions, billions, etc. of subscribers (e.g., subscriber devices). In this way, OCS 245 may determine quota to allocate to subscribers (e.g., subscriber devices) in a manner that cannot be performed manually or objectively by a human actor. In some implementations, OCS 245 may determine the quota in a manner that is the same as or similar to that described above with respect to FIGS. 1C and 1D.

In some implementations, OCS 245 may determine whether the rate satisfies a threshold. In this case, OCS 245 may determine the second quota based on determining whether the rate satisfies the threshold. In some implementations, OCS 245 may determine that the rate satisfies the threshold. In this case, OCS 245 may determine a value of the second quota that is higher than a value of the first quota. In some implementations, OCS 245 may determine that the rate does not satisfy the threshold. In this case, OCS 245 may determine a value of the second quota that is lower than a value of the first quota.

In this way, OCS 245 may determine a second quota to allocate to the subscriber (e.g., the subscriber device) based on the rate, which may enable OCS 245 to cause the second quota to be allocated to the subscriber (e.g., the subscriber device).

As further shown in FIG. 5, process 500 may include causing the second quota to be allocated to the subscriber (e.g., the subscriber device) (block 560). For example, OCS 245 (e.g., using processor 320, memory 330, storage component 340, communication interface 370, and/or the like) may cause the second quota to be allocated to the subscriber (e.g., subscriber device 205). In practice, OCS 245 may cause quota to be allocated to thousands, millions, billions, etc. of subscribers (e.g., subscriber devices). In this way, OCS 245 may cause quota to be allocated to subscribers (e.g., subscriber devices) in a manner that cannot be performed manually or objectively by a human actor. In some implementations, OCS 245 may cause the quota to be allocated in a manner that is the same as or similar to that described above with respect to FIGS. 1C and 1D.

In this way, OCS 245 may cause the second quota to be allocated to the subscriber (e.g., the subscriber device).

Table 2 shows example quantifications of reductions of Gy diameter messages—e.g., in a case where a subscriber (e.g., a subscriber device) consumes all data available in a prepaid data plan in a single period (e.g., a single "sitting")—based on real-time usage of network resources by the subscriber (e.g., the subscriber device). As shown in Table 2, implementation of intelligent quota allocation based on real-time usage of network resources (e.g., as described above with respect to example implementation 170 and/or process 500), relative to not implementing such intelligent quota allocation, can result in a reduction in a quantity of Gy diameter messages relating to the subscriber (e.g., the subscriber device) (e.g., by 71% in a case where the subscriber is subscribed to a prepaid data plan A, by 80% in a case where the subscriber is subscribed to a prepaid data plan B, by 83% in a case where the subscriber is subscribed to a prepaid data plan C, and by 86% in a case where the subscriber is subscribed to the "Other Plan"). Here, OCS 245 is assumed to allocate a quota for use of a maximum of 2,048 MB of data. In a case where OCS 245 allocates a higher quota (e.g., for use of more than 2,048 MB of data), the reduction of Gy diameter messages may be even greater.

TABLE 2

Example Baseline Values

| | |
|---|---|
| Quota (% of bucket) | 10 |
| Max Quota for unlimited plans (MB) | 2048 |
| Max Quota for prepaid (capped) plans (MB) | 250 |
| Min Quota (MB) | 50 |
| Diameter messages per Quota | 2 |
| # of CCR-u messages to close out bucket | 2 |

| Plan denomination | Plan A | Plan B | Plan C | Other Plan |
|---|---|---|---|---|
| Example Prepaid Plans | | | | |
| Plan size (GB) | 3 | 7 | 10 | 30 |
| Bucket size (MB) | 3072 | 7168 | 10240 | 30720 |
| Without "Intelligent" Quota Allocation | | | | |
| Quota size (MB) | 250 | 250 | 250 | 250 |
| Min # of Quotas | 13 | 29 | 41 | 123 |
| Total Gy diameter messages | 28 | 60 | 84 | 248 |
| Example "Intelligent" Quota Allocation | | | | |
| Max Quota | 2048 | 2048 | 2048 | 2048 |
| Min # of Quotas | 2 | 4 | 5 | 15 |
| # of Quotas needed to permit learning | 1 | 1 | 1 | 1 |
| # of Messages to permit learning | 2 | 2 | 2 | 2 |
| Total Gy diameter messages | 8 | 12 | 14 | 34 |
| Example Gy Diameter Message Reductions | | | | |
| # of messages reduced/eliminated | 20 | 48 | 70 | 214 |
| % reduction in Gy traffic | 71% | 80% | 83% | 86% |

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
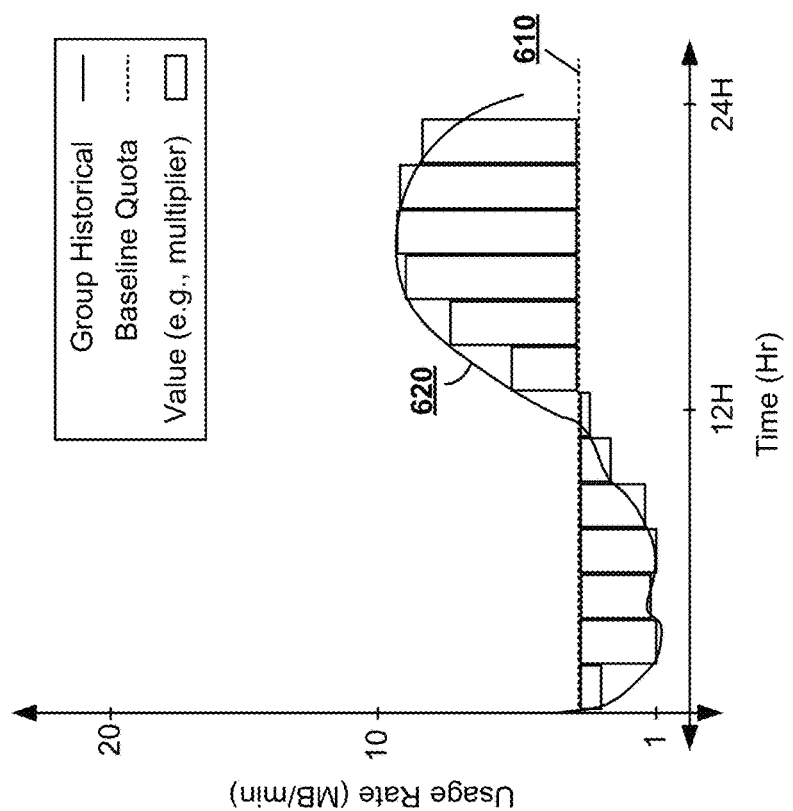
FIGS. 6A and 6B show example charts from which group values and subscriber values, described herein, may be determined.
Figure 6B:
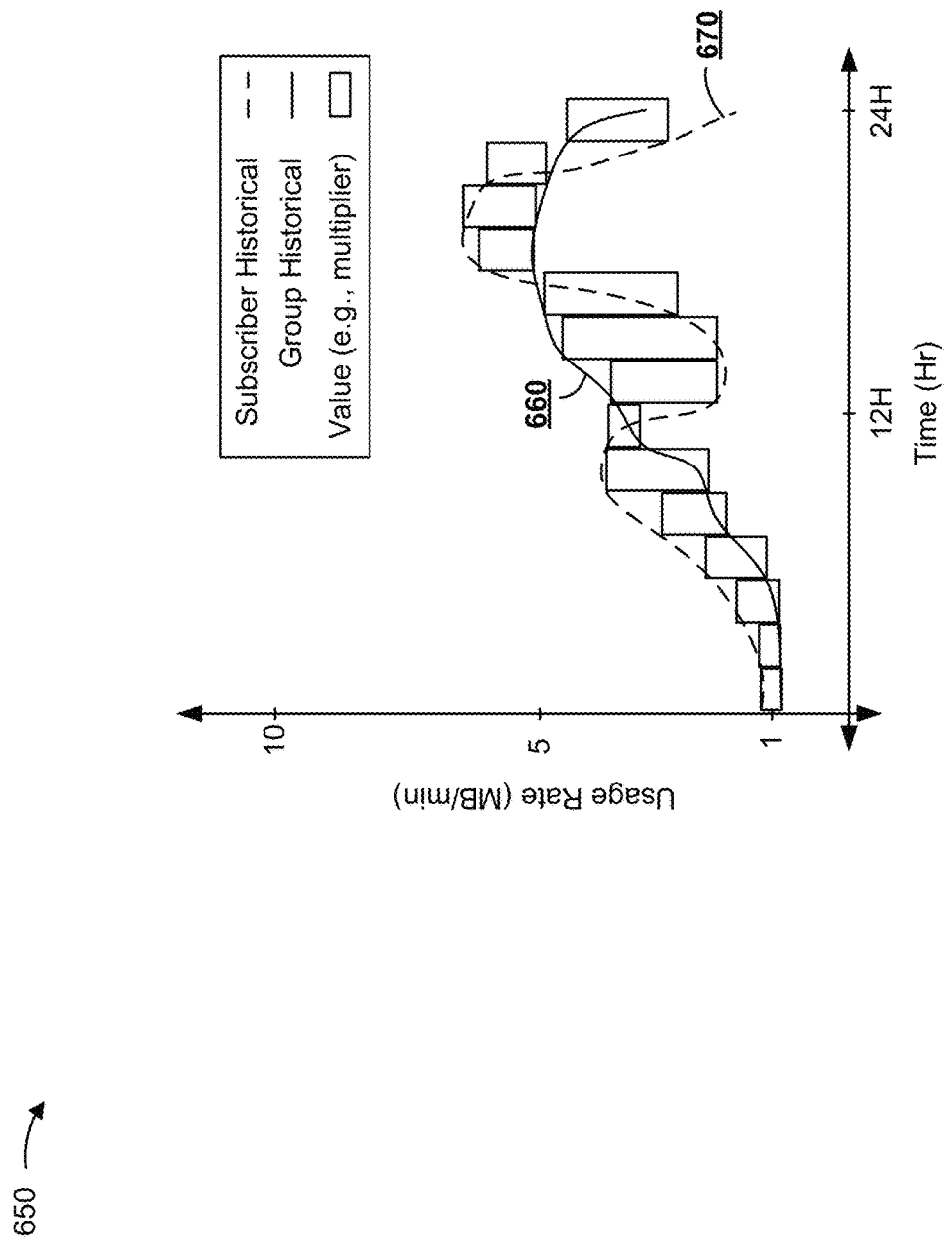

FIGS. 6A and 6B show example charts 600 and 650 from which group values and subscriber values, described herein, may be determined.

As shown in FIG. 6A, and as shown by reference number 610, example chart 600 may include a straight line that represents a constant rate of usage of data (e.g., in MB/minute), allocated according to a baseline quota, over the course of a day (e.g., a 24-hour period). As shown by reference number 620, example chart 600 may include a curve 620 that represents a historical rate at which data is utilized or consumed by a group of subscribers (e.g., a group of subscriber devices) over the course of the day. The historical rate may be an average rate at which data is utilized by subscribers in the group of subscribers (e.g., by subscriber devices in the group of subscriber devices), a median rate at which data is utilized by subscribers in the group of subscribers (e.g., by subscriber devices in the group of subscriber devices), a maximum rate at which data is utilized by subscribers in the group of subscribers (e.g., by subscriber devices in the group of subscriber devices), and/or the like.

As shown in FIG. 6A, group values may be determined (e.g., by OCS 245), for one or more time blocks throughout the day, based on the historical rate (reference number 620) relative to the constant rate of usage of data (reference number 610). Here, as shown, the group of subscribers (e.g., the group of subscriber devices) may utilize data at a rate that is slower than the constant rate of usage of data during the morning hours, and may utilize data at a rate that is faster than the constant rate of usage of data during the afternoon and evening hours. Thus, OCS 245 may, for example, determine, for morning hours, lower group values for the group of subscribers (e.g., the group of subscriber devices), and may determine, for afternoon hours, higher group values for the group of subscribers (e.g., the group of subscriber devices).

As shown in FIG. 6B, and as shown by reference number 660, example chart 650 may include a curve that represents a historical rate at which data is utilized (e.g., in MB/minute) by a group of subscribers (e.g., a group of subscriber devices) over the course of the day (e.g., a 24-hour period). As shown by reference number 670, example chart 650 may include a curve that represents a historical rate at which data is utilized by a subscriber (e.g., a subscriber device) over the course of the day. The historical rate at which data is utilized by the group of subscribers (e.g., the group of subscriber devices) may be an average rate at which data is utilized by subscribers in the group of subscribers (e.g., subscriber devices in the group of subscriber devices), a median rate at which data is utilized by subscribers in the group of subscribers (e.g., subscriber devices in the group of subscriber devices), a maximum rate at which data is utilized by subscribers in the group of subscribers (e.g., subscriber devices in the group of subscriber devices), and/or the like. The historical rate at which data is utilized by the subscriber (e.g., the subscriber device) may be an average rate at which data is utilized by the subscriber (e.g., the subscriber device), a median rate at which data is utilized by the subscriber (e.g., the subscriber device), a maximum rate at which data is utilized by the subscriber (e.g., the subscriber device), and/or the like.

As shown in FIG. 6B, subscriber values may be determined (e.g., by OCS 245), for one or more time blocks throughout the day, based on the historical rate at which data is utilized by the group of subscribers (e.g., the group of subscriber devices) (reference number 660) relative to the historical rate at which data is utilized by the subscriber (e.g., the subscriber device) (reference number 670). Here, as shown, the subscriber (e.g., the subscriber device) may, during the morning and early evening hours, utilize data at a rate that is faster than the rate at which data is utilized by the group of subscribers (e.g., the group of subscriber devices), and may, during the afternoon and late evening hours, utilize data at a rate that is slower than the rate at which data is utilized by the group of subscribers (e.g., the group of subscriber devices). Thus, OCS 245 may, for example, determine, for morning and early evening hours, higher subscriber values for the subscriber (e.g., the subscriber device), and may determine, for afternoon and late evening hours, lower subscriber values for the subscriber (e.g., the subscriber device). This permits more even spreading of instances of allocations of quota throughout the day, which reduces a quantity of call path messages (e.g., Gy diameter messages) needed to facilitate such allocations (thereby reducing network traffic and conserving network, processing, and memory resources).

As indicated above, FIGS. 6A and 6B are provided merely as examples. Other examples are possible and may differ from what was described with regard to FIGS. 6A and 6B.

Figure 7A:
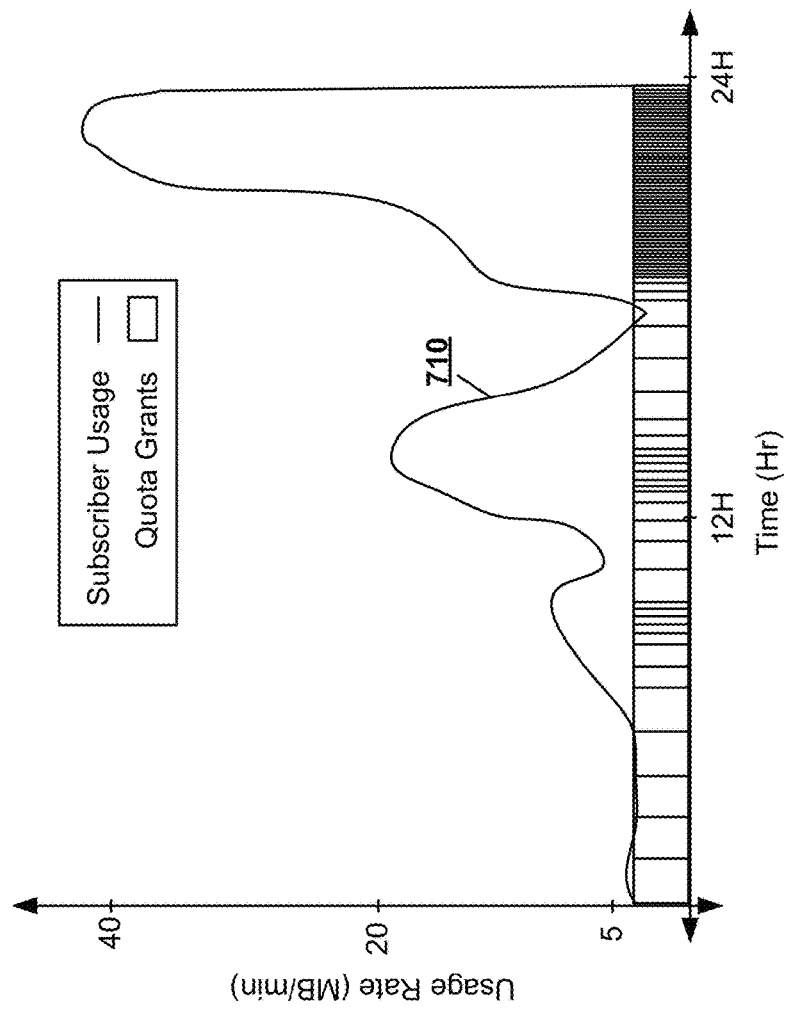
FIGS. 7A and 7B show example charts of allocation of quota by a network device alternatively not using, and using, implementations described herein.
Figure 7B:
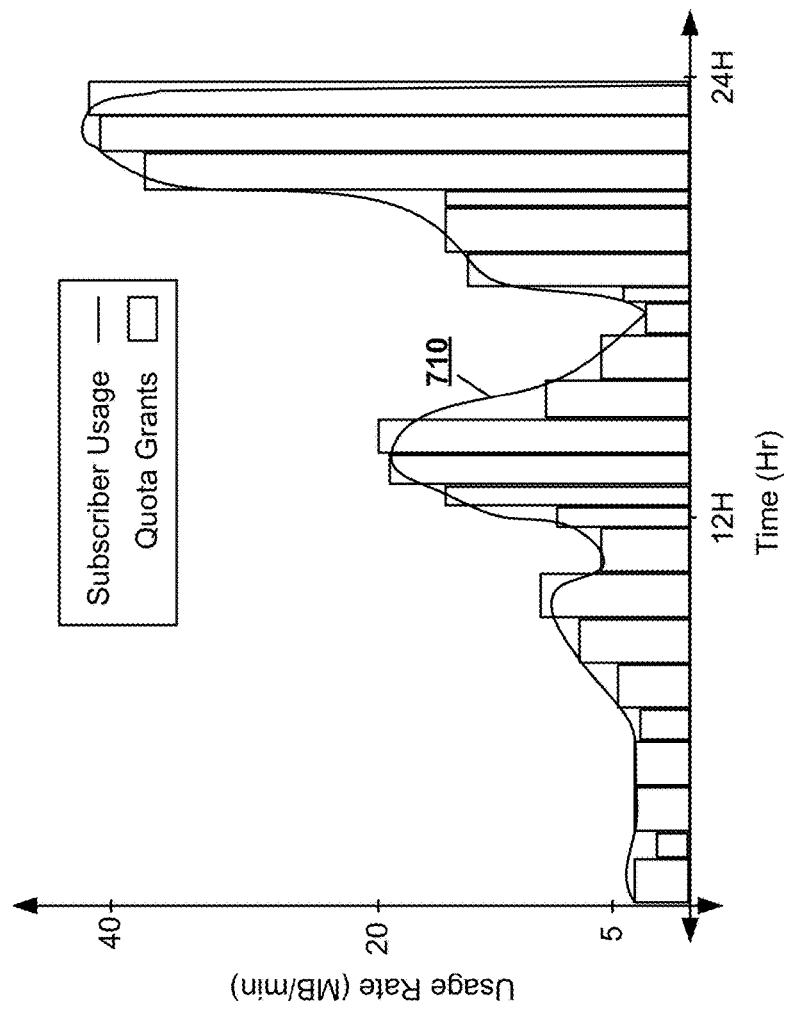

FIGS. 7A and 7B show example charts 700 and 750 alternatively not using, and using, implementations described herein (e.g., intelligent quota allocation based on real-time usage of network resources, as described above with respect to FIGS. 1C and 1D).

As shown in FIG. 7A, and as shown by reference number 710, example chart 700 may include a curve that represents a rate at which data is utilized (e.g., in MB/minute) by a subscriber (e.g., a subscriber device) in real-time over the course of the day (e.g., a 24-hour period). As shown in FIG.

7A, fewer instances of allocations of quota occur during periods of relatively slow rates of real-time usage of data by the subscriber (e.g., the subscriber device), whereas more frequent allocations of quota occur during periods of high rates of real-time usage of data by the subscriber (e.g., the subscriber device)—e.g., due to numerous requests for more data-related resources to be allocated to the subscriber (e.g., the subscriber device) by virtue of there being a fixed quota being allocated regardless of a high level of real-time usage of data by the subscriber (e.g., the subscriber device).

In contrast, as shown in FIG. 7B, and as shown by reference number 710, example chart 750 may include the same curve, that represents a rate at which data is utilized by the subscriber (e.g., the subscriber device) in real-time, as in example chart 700. Here, however, allocation of quota may be based on real-time usage of data by the subscriber (e.g., the subscriber device), and thus allocations of quota are much more infrequent. This permits more even spreading of instances of allocations of quota throughout the day, which reduces a quantity of call path messages (e.g., Gy diameter messages) needed to facilitate such allocations (thereby reducing network traffic and conserving network, processing, and memory resources).

As indicated above, FIGS. 7A and 7B are provided merely as examples. Other examples are possible and may differ from what was described with regard to FIGS. 7A and 7B.

Figure 8A:
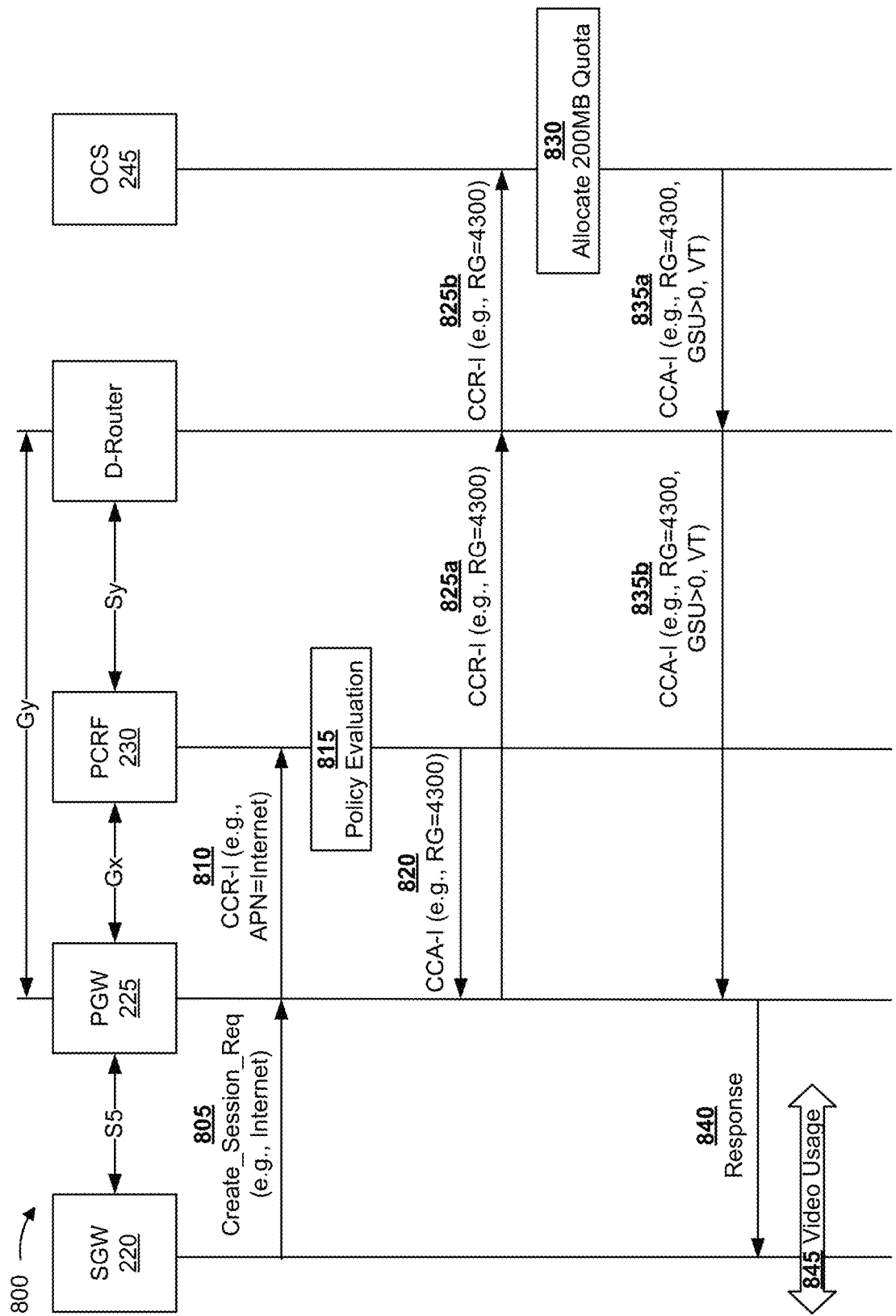
FIGS. 8A-8C are call flow diagrams of an example call flow relating to the example processes shown in FIGS. 4 and 5.
Figure 8B:
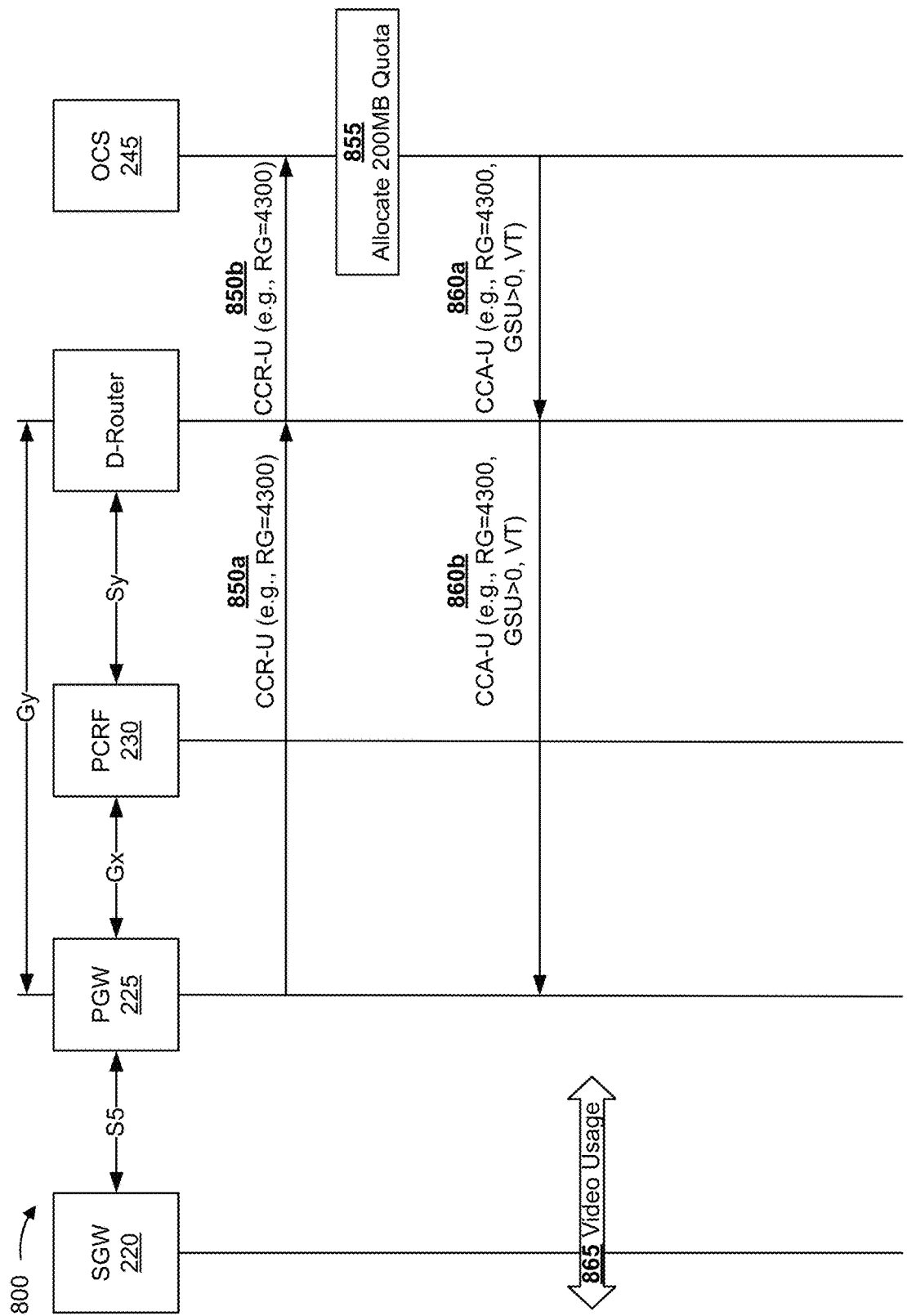
Figure 8C:
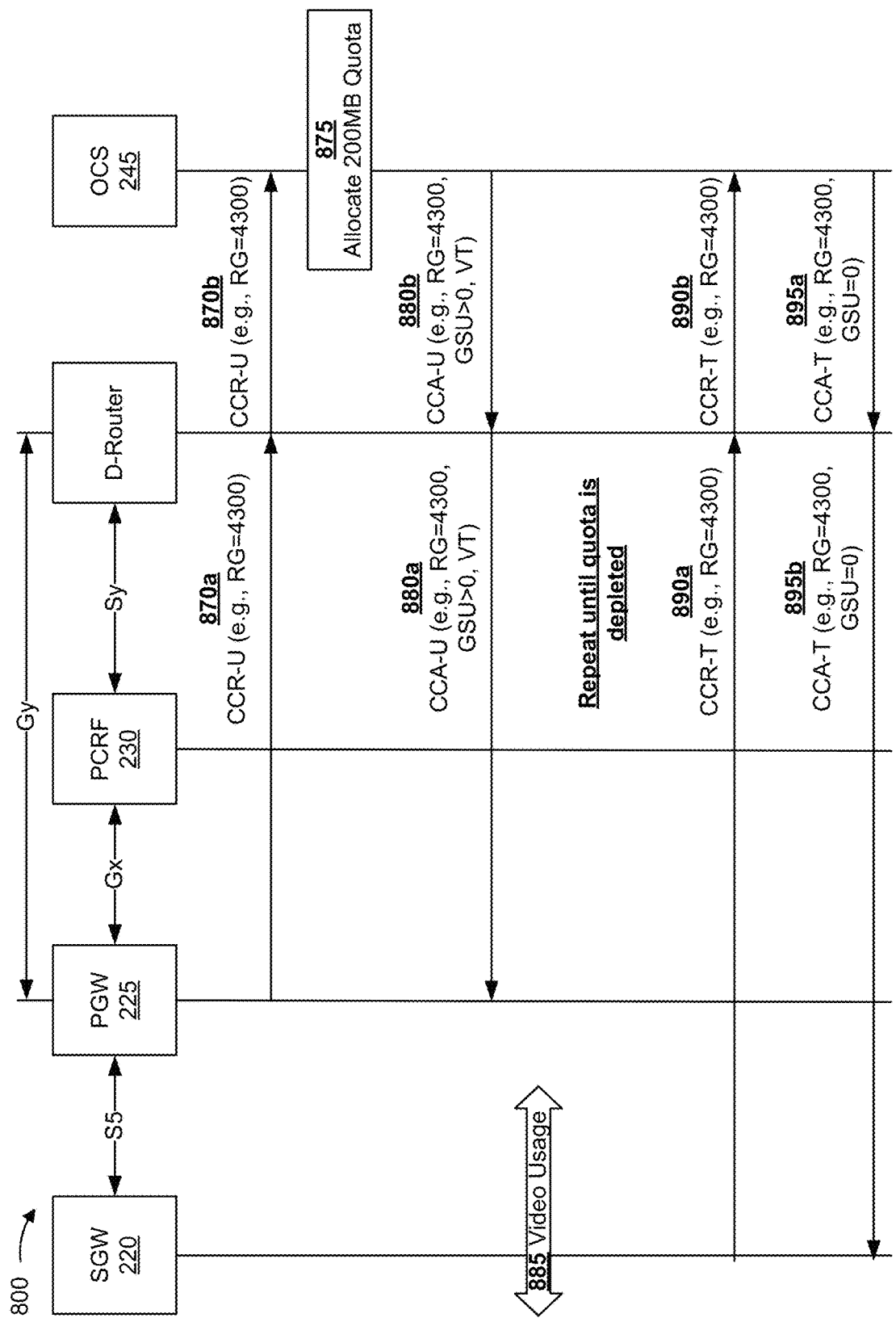

FIGS. 8A-8C are call flow diagrams of an example call flow 800 relating to example process 400 shown in FIG. 4 and/or example process 500 shown in FIG. 5. For example, implementation of intelligent quota allocation in example call flow 800 (e.g., based on historical and/or real-time usage of network resources, as described herein) may reduce a quantity of call path messages (e.g., Gy diameter messages) that need to be transmitted across a network.

As shown in FIG. 8A, and as shown by reference number 805, SGW 220 may transmit a create session request to PGW 225 over an S5 interface. For example, the create session request may originate from a subscriber device (e.g., subscriber device 205) associated with a subscriber. As shown in by reference number 810, PGW 225 may transmit a credit control request (initiate) (CCR-I) to PCRF 230 over a Gx interface. As shown by reference number 815, PCRF 230 may evaluate policies and/or rules associated with the subscriber (e.g., to determine whether subscriber device 205 is permitted to access and/or utilize network resources).

As shown by reference number 820, PCRF 230 may transmit a credit control answer (initiate) (CCA-I) (e.g., along with rating group information, such as whether the data session is associated with high speed data, low speed data, Wi-Fi hot spot, and/or the like). As shown by reference number 825a, PCRF 230 may transmit a CCR-I to a D-router, and as shown by reference number 825b, the D-router may transmit the CCR-I to OCS 245.

As shown by reference number 830, OCS 245 may allocate quota to the subscriber (e.g., subscriber device 205) (e.g., for use of 200 MB of data). As shown by reference number 835a, OCS 245 may transmit a CCA-I, specifying an amount of the quota and a validity time/timer, to the D-router, and as shown by reference number 835b, the D-router may transmit the CCA-I to PGW 225. As shown by reference number 840, PGW 225 may transmit a response to SGW 220 regarding the allocation, permitting subscriber device 205 to access data-related resources. As shown by reference number 845, subscriber device 205 may consume the data-related resources by streaming video(s).

As shown in FIG. 8B, and as shown by reference number 850a, PGW 225 may transmit a credit control request (update) (CCR-U) to the D-router, and as shown by reference number 850b, the D-router may transmit the CCR-U to OCS 245. For example, PGW 225 may transmit the CCR-U based on the subscriber (e.g., subscriber device 205) consuming the data-related resources or based on expiration of the validity timer. As shown by reference number 855, OCS 245 may allocate quota to the subscriber (e.g., subscriber device 205) (e.g., for use of another 200 MB of data). As shown by reference number 860a, OCS 245 may transmit a credit control answer (update) (CCA-U), specifying an amount of the additional/updated quota and a validity time/timer, to the D-router, and as shown by reference number 860b, the D-router may transmit the CCA-U to PGW 225. As shown by reference number 865, subscriber device 205 may consume additional data-related resources by streaming video(s).

As shown in FIG. 8C, and as shown by reference numbers 870a, 870b, 880a, 880b, and 885, the process described above with respect to reference numbers 850a-865 may repeat, and continue to repeat until all quota available to the subscriber (e.g., available in a prepaid plan subscribed to by the subscriber) is depleted.

As shown by reference number 890a, SGW 220 may transmit a credit control request (terminate) (CCR-T) to the D-router to terminate the data session, and as shown by reference number 890b, the D-router may transmit the CCR-T to OCS 245. For example, SGW 220 may transmit the CCR-T based on the subscriber (e.g., subscriber device 205) consuming the last available data-related resources or based on expiration of a validity timer. As shown by reference number 895a, OCS 245 may transmit a credit control answer (terminate) (CCA-T) to the D-router, and as shown by reference number 895b, the D-router may transmit the CCA-T to SGW 220, and the data session may terminate.

Implementation of intelligent quota allocation in example call flow 800 (e.g., based on historical and/or real-time usage of network resources, as described herein) may reduce a quantity of call path messages (e.g., Gy diameter messages) that need to be transmitted across a network. For example, rather than merely allocating a small amount of quota (e.g., a baseline quota) to the subscriber (e.g., subscriber device 205) in response to the CCR-I and/or one or more of the CCR-Us (e.g., at reference numbers 830, 855, and 875), OCS 245 may dynamically allocate quota based on a rate or velocity at which data is utilized by the subscriber (e.g., subscriber device 205) (e.g., here, a high rate for video streaming purposes) and/or based on the subscriber's (e.g., subscriber device 205's) historical usage of network resources (and/or historical usage of network resources by a group of subscribers (e.g., a group of subscriber devices) with which the subscriber (e.g., subscriber device 205) is associated), as described elsewhere herein (e.g., with respect to FIGS. 1A-1D above).

In this way, OCS 245 may (without modifying an existing architecture of a network provider's telecommunications system) reduce a quantity of call path messages being transmitted across the network (e.g., CCR-Us being submitted to OCS 245 and/or CCA-Us being transmitted to PGW 225 in response to CCR-Us), which reduces network traffic and load, thereby conserving network, processing, and memory resources, and increasing overall network performance.

As indicated above, FIGS. 8A-8C are provided merely as examples. Other examples are possible and may differ from what was described with regard to FIGS. 8A-8C.

Some implementations, described herein, enable OCS 245 to dynamically (or intelligently) allocate quota to a subscriber device 205 based on subscriber device 205's historical usage of network resources and/or based on historical usage of network resources by a group of subscriber devices with which subscriber device 205 is associated. In some implementations, OCS 245 is capable of dynamically (or intelligently) allocating quota based on subscriber device 205's current pattern of consumption or utilization of network resources in real-time. In this way, OCS 245 may reduce or eliminate the possibility of over-allocating and/or under-allocating network resources to subscriber device 205, which optimizes the overall allocation of network resources across the network provider's subscriber base, and optimizes network traffic in network environments, such as 5G networks. In addition, this reduces a quantity of call path messages (e.g., messages between PGW 225 and OCS 245 over a diameter Gy interface and/or the like) that need to be transmitted between devices of the network for purposes of allocating quota, and reduces a quantity of billing-related records (e.g., diameter Rf records) that need to be created and/or maintained (e.g., by the PGW, by a CCF, and/or the like). This reduces workload on the devices of the network, which conserves network, processing, and memory resources, and reduces the chance of failure relating to transmission and receipt of such messages, thereby improving overall system reliability. Furthermore, intelligent allocation of quota reduces or eliminates the possibility of starvation of network resources by freeing up network resources for use by various applications, since a final portion of available network resources may be dynamically allocated, in smaller increments, for use by different applications.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   receive a first credit control request, from a network device, to allocate a quota to a subscriber device,
     the quota relating to access, by the subscriber device, to network resources provided by a network provider;
   determine a subscriber value based on historical usage of the network resources by the subscriber device,
     the subscriber value being associated with the subscriber device,
     the subscriber value being determined in relation to a baseline quota,
       the baseline quota being granted at initiation of a data session and associated with a validity timer, and
     the subscriber value being a value at a first time period and a different value at a second time period,
       the first time period and the second time period being one of:
         specific hours of a day,
         days of a week,
         days of a month, or
         days of a year;
   identify a group value based on historical usage of the network resources by a group of subscriber devices at the first time period or the second time period,
     the group value being different from the subscriber value,
     the subscriber device being a part of the group of subscriber devices, and
     the group value determined in relation to the baseline quota;

determine a particular quota to allocate to the subscriber device based on the baseline quota, the subscriber value, and the group value,
   the one or more processors, when determining the particular quota, being to:
      calculate the particular quota by multiplying the baseline quota by the subscriber value and the group value, and
      the particular quota representing an amount of the network resources associated with the subscriber device during a particular time interval as monitored by the validity timer;
perform one or more actions to cause the particular quota to be allocated to the subscriber device based on determining the particular quota; and
receive a second credit control request to allocate an additional quota to the subscriber device, from the group of subscriber devices having the group value based on the historical usage, after the validity timer expires for the particular quota.

2. The device of claim 1, wherein the quota relates to access to at least one of:
data-related resources,
voice-related resources,
messaging-related resources, or
balance-related resources.

3. The device of claim 1, wherein the group of subscriber devices includes:
other subscriber devices that utilize the network resources in a manner that corresponds to a manner in which the subscriber device utilizes the network resources.

4. The device of claim 1, wherein the one or more processors, are further to:
monitor usage of the network resources by the subscriber device over time with the validity timer; and
wherein the one or more processors, when determining the subscriber value, are to:
determine the subscriber value based on the monitored usage.

5. The device of claim 1, wherein the one or more processors, are further to:
monitor usage of the network resources by one or more other subscriber devices in the group of subscriber devices over time; and
wherein the one or more processors, when identifying the group value, are to:
identify the group value based on the monitored usage.

6. The device of claim 1, wherein the one or more processors, are further to:
determine a pattern of consumption of the network resources by the subscriber device; and
wherein the one or more processors, when determining the particular quota, are to:
determine the particular quota further based on the pattern of consumption of the network resources.

7. A non-transitory computer-readable medium storing instructions, the instructions comprising:
one or more instructions that, when executed by one or more processors, cause the one or more processors to:
receive a first credit control request, from a network device, to allocate a quota to a subscriber device,
   the quota relating to access, by the subscriber device, to network resources provided by a network provider;
determine a subscriber value based on historical usage of the network resources by the subscriber device,
   the subscriber value being associated with the subscriber device,
   the subscriber value being determined in relation to a baseline quota,
      the baseline quota being granted at initiation of a data session and associated with a validity timer, and
   the subscriber value being a value at a first time period and a different value at a second time period,
      the first time period and the second time period being one of:
         specific hours of a day,
         days of a week,
         days of a month, or
         days of a year;
identify a group value based on historical usage of the network resources by a group of subscriber devices after receiving the first credit control request at the first time period or the second time period,
   the group value being different from the subscriber value,
   the subscriber device being a part of the group of subscriber devices, and
   the group value determined in relation to the baseline quota;
cause a first quota to be allocated to the subscriber device based on multiplying the baseline quota by the subscriber value and the group value;
receive a second credit control request, from the network device, to allocate an additional quota to the subscriber device, from the group of subscriber devices having the group value based on the historical usage, after the validity timer has expired for the first quota;
determine a rate at which the network resources corresponding to the first quota are consumed by the subscriber device;
determine a second quota to allocate to the subscriber device based on the rate; and
cause the second quota to be allocated to the subscriber device.

8. The non-transitory computer-readable medium of claim 7, wherein the one or more instructions, that cause the one or more processors to determine the rate at which the network resources corresponding to the first quota are consumed by the subscriber device, cause the one or more processors to:
determine the rate at which the network resources corresponding to the first quota are consumed by the subscriber device based on a time of receipt of the second credit control request.

9. The non-transitory computer-readable medium of claim 7, wherein the one or more instructions, when executed by the one or more processors, further cause the one or more processors to:
determine whether the rate satisfies a threshold; and
wherein the one or more instructions, that cause the one or more processors to determine the second quota, cause the one or more processors to:
determine the second quota based on determining whether the rate satisfies the threshold.

10. The non-transitory computer-readable medium of claim 9, wherein the one or more instructions, when executed by the one or more processors, further cause the one or more processors to:

determine that the rate satisfies the threshold; and
wherein the one or more instructions, that cause the one or more processors to determine the second quota, cause the one or more processors to:
  determine a value of the second quota that is greater than a value of the first quota.

11. The non-transitory computer-readable medium of claim 9, wherein the one or more instructions, when executed by the one or more processors, further cause the one or more processors to:
determine that the rate does not satisfy the threshold; and
wherein the one or more instructions, that cause the one or more processors to determine the second quota, cause the one or more processors to:
  determine a value of the second quota that is less than a value of the first quota.

12. The non-transitory computer-readable medium of claim 9, wherein the first credit control request and the second credit control request relate to data-related resources provided by the network provider.

13. A method, comprising:
receiving, by a network device and from an additional network device, a first credit control request to allocate a quota to a subscriber device,
  the quota relating to access, by the subscriber device, to network resources provided by a network provider;
determining, by the network device, a subscriber value based on historical usage of the network resources by the subscriber device,
  the subscriber value being associated with the subscriber device, the subscriber value being determined in relation to a baseline quota,
    the baseline quota being granted at initiation of a data session and associated with a validity timer, and
  the subscriber value being a value at a first time period and a different value at a second time period,
    the first time period and the second time period being one of:
      specific hours of a day,
      days of a week,
      days of a month, or
      days of a year;
identifying, by the network device, a group value based on the historical usage of the network resources by a group of subscriber devices at the first time period or the second time period,
  the group value being different from the subscriber value,
  the subscriber device being a part of the group of subscriber devices, and
  the group value determined in relation to the baseline quota;
determining, by the network device, a particular quota to allocate to the subscriber device based on historical usage of the network resources by the group of subscriber devices at the first time period or the second time period and on real-time utilization of the network resources by the subscriber device,
  where determining the particular quota comprises:
    calculating the particular quota by multiplying the baseline quota by the subscriber value and the group value, and
performing, by the network device, one or more actions to cause the particular quota to be allocated to the subscriber device based on determining the particular quota,
  the particular quota being associated with the validity timer having a time interval during which the particular quota is valid; and
receiving, by the network device, a second credit control request to allocate an additional quota to the subscriber device, from the group of subscriber devices having the group value based on the historical usage, after the validity timer expires for the particular quota.

14. The method of claim 13, wherein the first credit control request relates to the quota for a prepaid plan or a postpaid plan associated with the subscriber device.

15. The method of claim 13, wherein determining the particular quota comprises:
determining the particular quota further based on a network overload condition.

16. The method of claim 13, further comprising:
receiving a subsequent request to allocate the quota to the subscriber device; and
determining another quota based on a velocity at which the network resources corresponding to the particular quota is consumed by the subscriber device.

17. The method of claim 13, further comprising:
performing one or more actions to cause the validity timer to be initiated for the particular quota; and
receiving a return of unused quota after the validity timer expires.

18. The device of claim 1, wherein the one or more processors, are further to:
determine real-time utilization of the network resources by the subscriber device; and
wherein the one or more processors, when determining the particular quota, are to:
  determine the particular quota based on the real-time utilization of the network resources by the subscriber device.

19. The device of claim 1, wherein the one or more processors, are further to:
receive a subsequent request to allocate the quota to the subscriber device;
determine another quota based on a velocity at which the network resources corresponding to the particular quota are consumed by the subscriber device; and
perform an action to cause the other quota to be allocated to the subscriber device based on determining that the quota is not depleted.

20. The method of claim 13, wherein the group of subscriber devices includes:
other subscriber devices that utilize the network resources in a manner that corresponds to a manner in which the subscriber device utilizes the network resources.

* * * * *